(12) United States Patent
Kimura

(10) Patent No.: US 7,808,577 B2
(45) Date of Patent: Oct. 5, 2010

(54) LIGHT SOURCE DEVICE AND LIQUID CRYSTAL DISPLAY

(75) Inventor: Akira Kimura, Tokyo (JP)

(73) Assignee: Sony Corporation, Tokyo (JP)

( * ) Notice: Subject to any disclaimer, the term of this patent is extended or adjusted under 35 U.S.C. 154(b) by 233 days.

(21) Appl. No.: 12/038,340

(22) Filed: Feb. 27, 2008

(65) Prior Publication Data

US 2008/0218658 A1   Sep. 11, 2008

(30) Foreign Application Priority Data

Feb. 28, 2007   (JP) .............................. 2007-049981

(51) Int. Cl.
   *G02F 1/1335* (2006.01)
   *G09G 3/36* (2006.01)
   *G09G 5/00* (2006.01)

(52) U.S. Cl. ............................... 349/65; 349/5; 349/62; 362/97.1; 362/97.3; 362/606; 362/607; 362/620

(58) Field of Classification Search .................... 349/5, 349/62, 65; 362/606, 607, 620, 97.1, 97.3; 345/102
   See application file for complete search history.

(56) References Cited

U.S. PATENT DOCUMENTS 5,390,276 A * 2/1995 Tai et al. ..................... 385/146

2003/0231160 A1* 12/2003 Yoshihara et al. ........... 345/102
2005/0024699 A1* 2/2005 Liu ............................. 359/196

FOREIGN PATENT DOCUMENTS

JP   2002-296588   10/2002
JP   2006-220685   8/2006

* cited by examiner

*Primary Examiner*—Michael H Caley
(74) *Attorney, Agent, or Firm*—Sonnenschein Nath & Rosenthal LLP

(57) ABSTRACT

A light source device capable of realizing a color display having the high light-use efficiency with a simple configuration is provided. Provided is a light source device including a prism sheet disposed to face a plane to be irradiated, and to bend an incident light to a direction substantially orthogonal to an incident direction; a light source section separately emitting a plurality of color lights having wavelength regions different from each other so that each of the color lights enters into the prism sheet at a small angle with respect to an extending direction of the prism sheet; and a light source drive means for driving the light source section so that each of the color lights periodically scans the plane to be irradiated so as to perform the line-sequential irradiation operation.

18 Claims, 33 Drawing Sheets

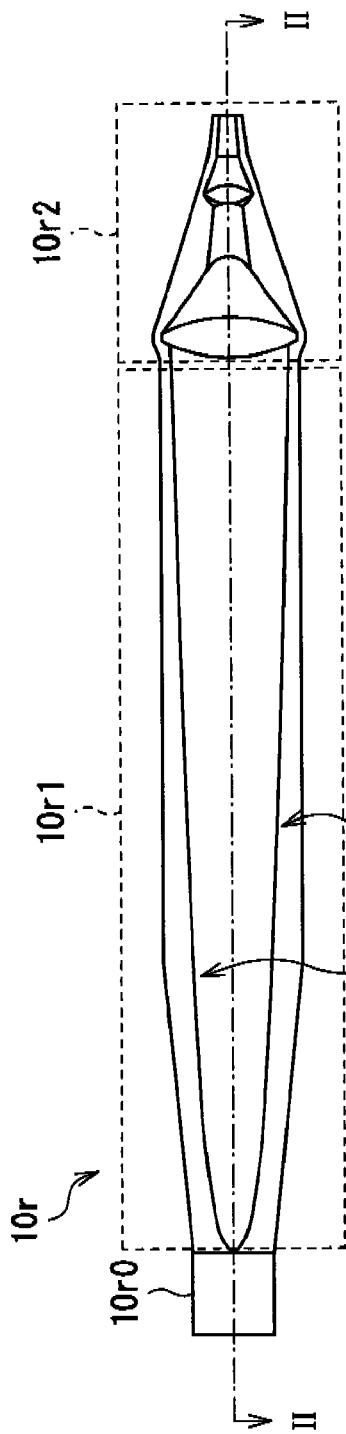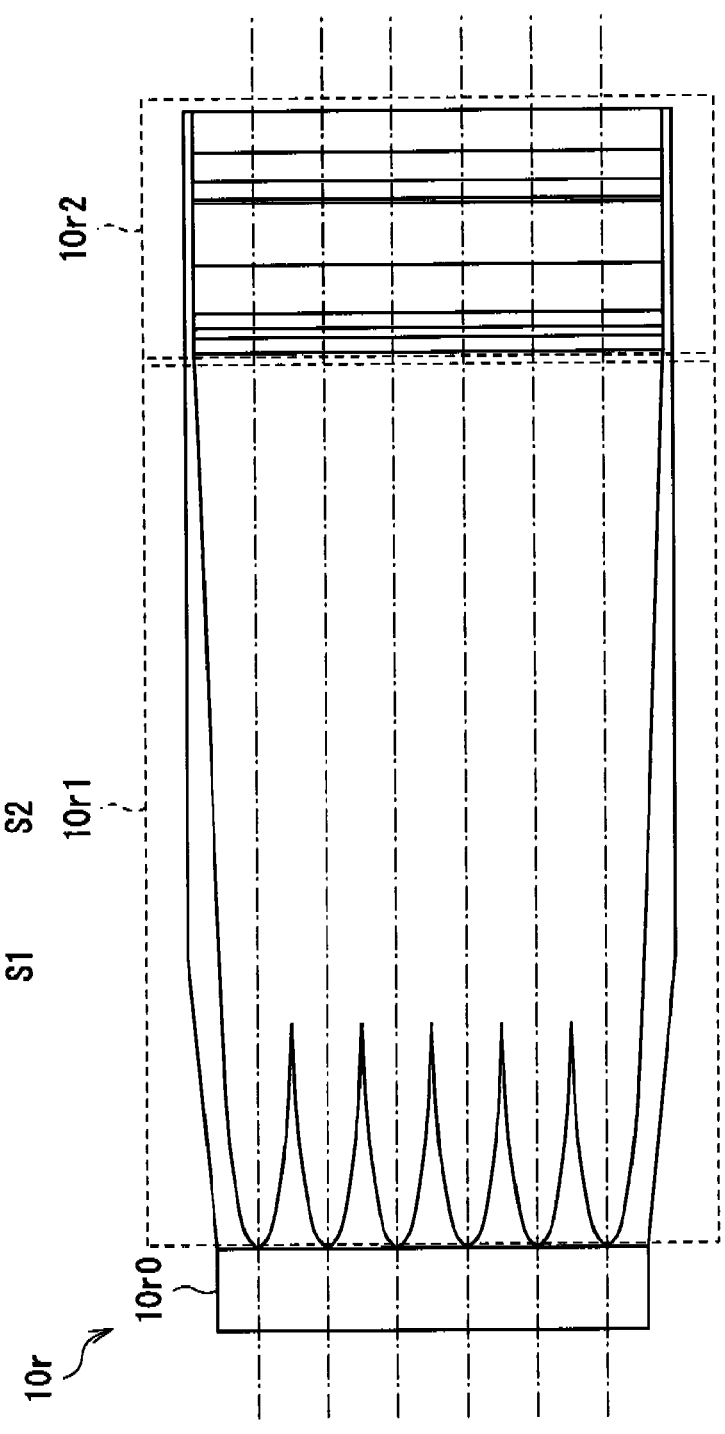
FIG. 10A
FIG. 10B

US 7,808,577 B2

LIGHT SOURCE DEVICE AND LIQUID CRYSTAL DISPLAY

CROSS REFERENCES TO RELATED APPLICATIONS

The present invention contains subject matter related to Japanese Patent Application JP 2007-049981 filed in the Japanese Patent Office on Feb. 28, 2007, the entire contents of which being incorporated herein by reference.

BACKGROUND OF THE INVENTION

1. Field of the Invention

The present invention relates to a light source device emitting a plurality of color lights and a liquid crystal display provided with such a light source device.

2. Description of the Related Art

In liquid crystal displays of the related art, a color display is performed by using a light source always emitting white light (for example, cold cathode fluorescent lamp (CCFL)), or using a combination of Light Emitting Diode (LED) and color filters of each of R (red), G (green) and B (blue).

However, because a light loss is large in the color filters, use efficiency of a light from the light source is remarkably reduced. Thus, as methods to realize the color display without using such color filters, there are proposed methods such as a so-called field sequential method, a method where, for example, a plurality of light sources for each of the colors are lighted in order (for example, Japanese Unexamined Patent Publication Nos. 2002-296588 and 2006-220685) or the like. In short, these are the methods where one frame period is divided into a plurality of sub-frame periods so that an image for each of R, G and B is displayed by time-division. According to these methods, the light loss by the color filters can be avoided, thereby it is considered that the use efficiency of the light from the light source is improved correspondingly. Also, the color filters are unnecessary, thereby it is considered that the cost reduction of the member can be achieved correspondingly.

SUMMARY OF THE INVENTION

In the method according to Japanese Unexamined Patent Publication Nos. 2002-296588 and 2006-220685, although line-sequential lighting for each of the color lights is performed by using a plurality of light sources for each of the colors, it does not mean a departure from the principles of the abovementioned field sequential method. A period of time when each one of the light sources is lighted in one frame period is short as calculated by the principles of the field sequential method. Thus, in such a case, the light emission luminance of each of the light sources in the lighting period is necessarily set high, and this leads to the large cost increase for the member of the light source. Also, because a plurality of light sources are necessarily provided for each of the colors, this also leads to another cost increase for the member of the light source.

Thus, there is considered a method that each of the color lights itself from the light source is line-sequentially irradiated to the liquid crystal display panel acting as an irradiation plane. To realize such a method, it is considered that the configuration of the light source includes the light source emitting each of the color lights, and polygon mirrors for each of the colors, the polygon mirrors rotating and reflecting each of the color lights so that each of the color lights is line-sequentially emitted.

However, in the case that the configuration of the light source includes polygon mirrors corresponding to each of the color lights in such a way, the light source device is increased in dimension due to the necessity that the polygon mirrors are provided for each of the colors, and due to the reflection action by the polygon mirrors.

As just described, in the related art, it is difficult to realize a color display with the high light-use efficiency while suppressing the cost for the member and miniaturizing (thinning) the device configuration.

In view of the foregoing, it is desirable to provide a light source device capable of realizing a color display having the high light-use efficiency with a simple configuration, and a liquid crystal display provided therewith.

A light source device of an embodiment of the invention includes a prism sheet, a light source section, and a light source drive means. The prism sheet is disposed to face a plane to be irradiated, and to bend an incident light to a direction substantially orthogonal to incident direction. The light source section is capable of separately emitting a plurality of color lights having wavelength regions different from each other so that each of the color lights enters into the prism sheet at a small angle with respect to an extending direction of the prism sheet. The light source drive means drives the light source section so that each of the color lights periodically scans the plane to be irradiated so as to perform the line-sequential irradiation operation.

A liquid crystal display according to an embodiment of the invention includes an irradiation means for emitting a light, and a liquid crystal panel modulating the light emitted from the irradiation means on the basis of an image signal. The irradiation means has the prism sheet, the light source section, and the light source drive means. Here, the prism sheet is disposed to face the liquid crystal panel, and is capable of bending the incident light to a direction substantially orthogonal to the incident direction. The light source section separately emits a plurality of color lights having wavelength regions different from each other so that each of the color lights enters into the prism sheet at a small angle with respect to an extending direction of the prism sheet. The light source drive means drives the light source section so that each of the color lights periodically scans the plane to be irradiated so as to perform the line-sequential irradiation operation in the liquid crystal panel.

In the light source device and the liquid crystal display according to an embodiment of the invention, the light source section separately emits a plurality of color lights having wavelength regions different from each other so that the color lights enters into the prism sheet at a small angle with respect to an extending direction of the prism sheet. Each of the entered color lights is bended at the prism sheet to a direction substantially orthogonal to the incident direction, and irradiated to the plane to be irradiated (or the liquid crystal panel). At this time, each of the color lights emitted from the light source section is controlled in order to periodically scan the plane to be irradiated (or the liquid crystal panel) and perform the line-sequential irradiation operation.

The light source device according to an embodiment of the invention preferably includes a light guide section disposed between the light source section and the prism sheet, and configured by stacking a plurality of light guide plates, each of the light guide plates being configured to guide each of the color lights to the prism sheet. In such a configuration, the emitted light from the light source section advances through each of the layered light guide plates to be guided to the prism sheet so that the diffusion of the emitted light between the light source section and the prism sheet can be minimized.

Therefore, a displacement width of the irradiation position of each of the color lights on the irradiation plane due to the diffusion of the emission light is also minimized.

According to the light source device or the liquid crystal display of an embodiment of the invention, provided are a prism sheet capable of bending the incident light to a direction substantially orthogonal to the incident direction, and a light source section capable of separately emitting, at a small angle, a plurality of color lights having wavelength regions different from each other, and each of the color lights periodically scans the plane to be irradiated so as to perform line-sequential irradiation operation. Therefore, the color display can be realized without providing a plurality of light sources and color filters for each of the colors, and the cost reduction for the member can be achieved. Also, the light source device can be miniaturized (thinned) in comparison with a case where the polygon mirrors are provided for each of the colors. Therefore, the color display having the high light-use efficiency with a simple configuration can be realized.

Other and further objects, features and advantages of the invention will appear more fully from the following description.

BRIEF DESCRIPTION OF THE DRAWINGS

FIGS. 10A and 10B are enlarged cross-sectional views showing a red light irradiation section illustrated in FIG. 6.

DETAILED DESCRIPTION OF THE PREFERRED EMBODIMENTS

Hereinafter, preferred embodiments of the present invention will be described in detail with reference to the accompanying drawings.

Figure 1:
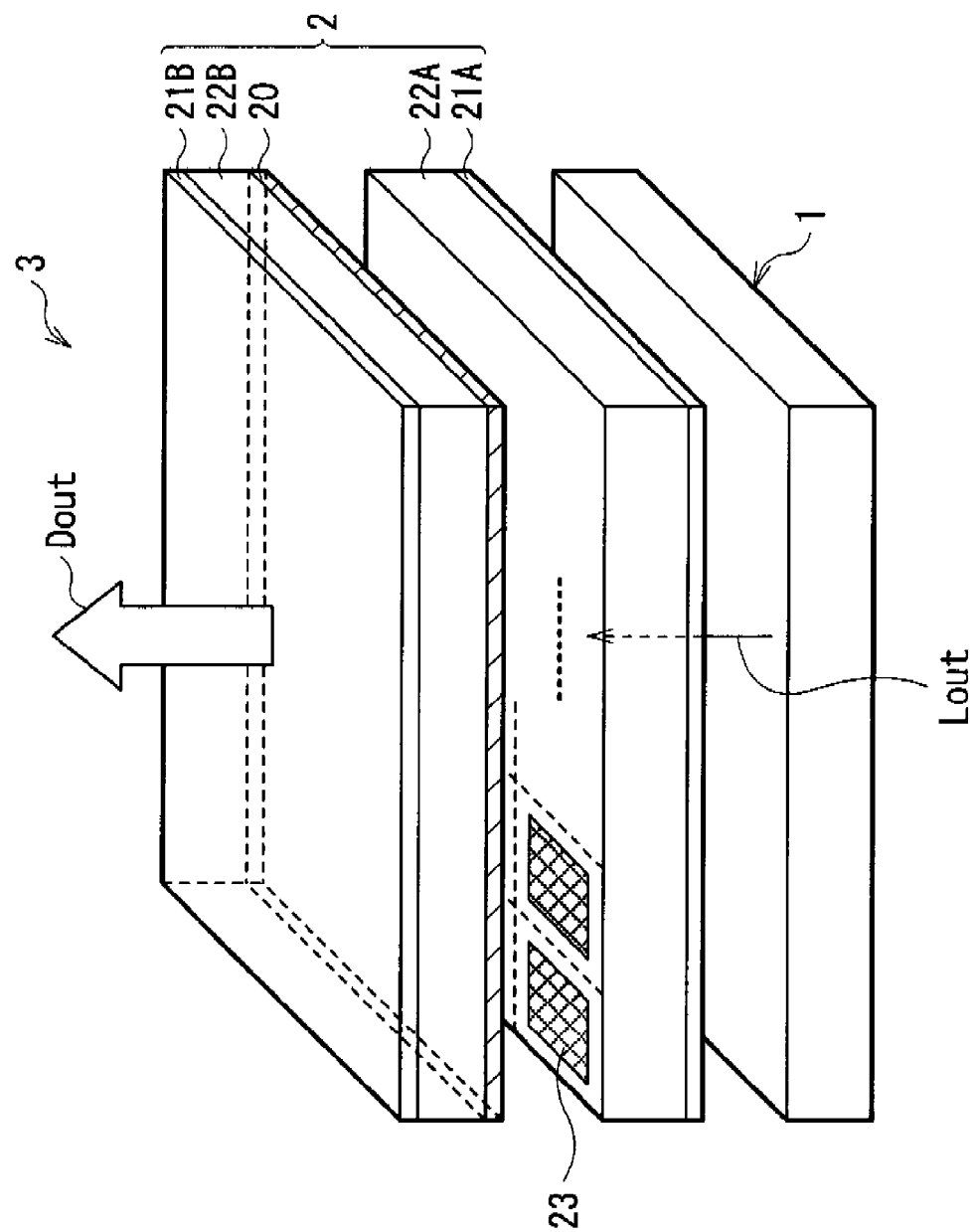
FIG. 1 is an exploded perspective view showing the overall configuration of a liquid crystal display according to an embodiment of the present invention.

FIG. 1 is an exploded perspective view schematically showing the overall configuration of a liquid crystal display (a liquid crystal display 3) according to an embodiment of the present invention. The liquid crystal display 3 is applied to a so-called transmissive liquid crystal display emitting a transmissive light as a display light Dout, and includes a backlight system 1 and a transmissive liquid crystal display panel 2.

The liquid crystal display panel 2 is composed of a transmissive liquid crystal layer 20, a pair of substrates with the liquid crystal layer 20 in between, that is, a TFT (thin film transistor) substrate 22A as a substrate on the backlight system 1 side, a facing electrode substrate 22B as a substrate facing the TFT substrate 22A, and a polarizing plate 21A which is stacked on the opposite side of the facing electrode substrate 22A from the liquid crystal layer 20 and a polarizing plate 21B which is stacked on the opposite side of the facing electrode substrate 22B from the liquid crystal layer 20. In the TFT substrate 22A, pixels are configured in matrix form, and a pixel electrode 23 including a driving element such as TFT or the like is formed in each pixel.

The backlight system 1 can separately emit, as a illumination light Lout, a plurality of color lights (in this case, a red light Lr, a green light Lg and a blue light Lb) having wavelength regions different from each other.

Figure 2:
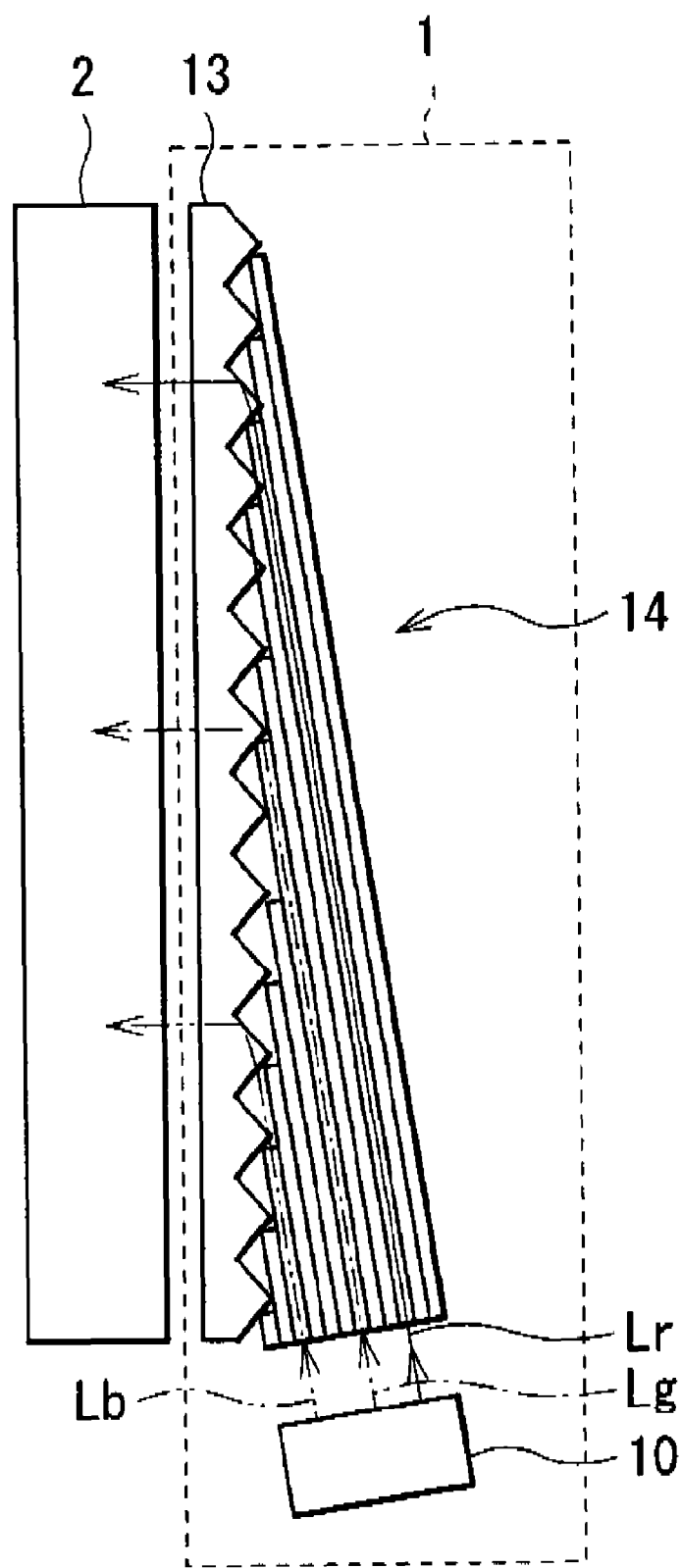
FIG. 2 is a cross-sectional view showing a configuration example of a backlight system illustrated in FIG. 1

FIG. 2 is a cross-sectional view showing a configuration example of the backlight system 1.

The backlight system 1 includes a light source section 10 which can respectively and separately emit the red light Lr, the green light Lg, and the blue light Lb so that the emission direction of the red light Lr, the green light Lg, and the blue light Lb is oriented in a periodical line-sequential direction, a prism sheet 13 which can respectively and separately bend the red light Lr, the green light Lg, and the blue light Lb in order to guide them to the liquid crystal display panel 2, and a stacked light guide plate 14 made of a plurality of light guide plates in thin plate form and provided between the light source section and the prism sheet 13.

The light source section 10 includes, for example, a light source such as a laser diode, LED or the like irradiating a light to a light entrance of the stacked light guide plate 14, and irradiation optical system such as polygon prism or the like rotating about a certain central axis that will be described later. The light source section 10 is driven by a backlight drive section not shown in the figure (a backlight drive section 11 that will be descried later), and can respectively and line-sequentially irradiate the red light Lr, the green light Lg, and the blue light Lb to the liquid crystal display panel 2, as will be described later. Moreover, the light source section 10 is disposed so that the red light Lr, the green light Lg, and the blue light Lb are respectively entered into the prism sheet 13 at a small angle (for example, approximately 3°).

The stacked light guide plate 14 (a light guide section) is disposed to have an inclination of a small angle with respect to the prism sheet 13 (for example, approximately 3°). The stacked light guide plate 14 is configured by stacking a plurality of layered light guide plates separately guiding, to the prism sheet 13, the red light Lr, the green light Lg and the blue light Lb which are emitted from the light source section 10. These layered light guide plates are composed of, for example, PET (polyethylene terephthalate) sheet or the like, respectively.

The prism sheet 13 has a flat surface on the liquid crystal display panel 2 side, but has a slight prism in triangle shape on the light exit side of the stacked light guide plate 14. The prism sheet 13 can bend the incident light (in this case, the light emitted from the stacked light guide plate 14) at a substantially orthogonal angle (for example, approximately 90°) and is composed of, for example, antiprism which is available on the market.

Figure 3:
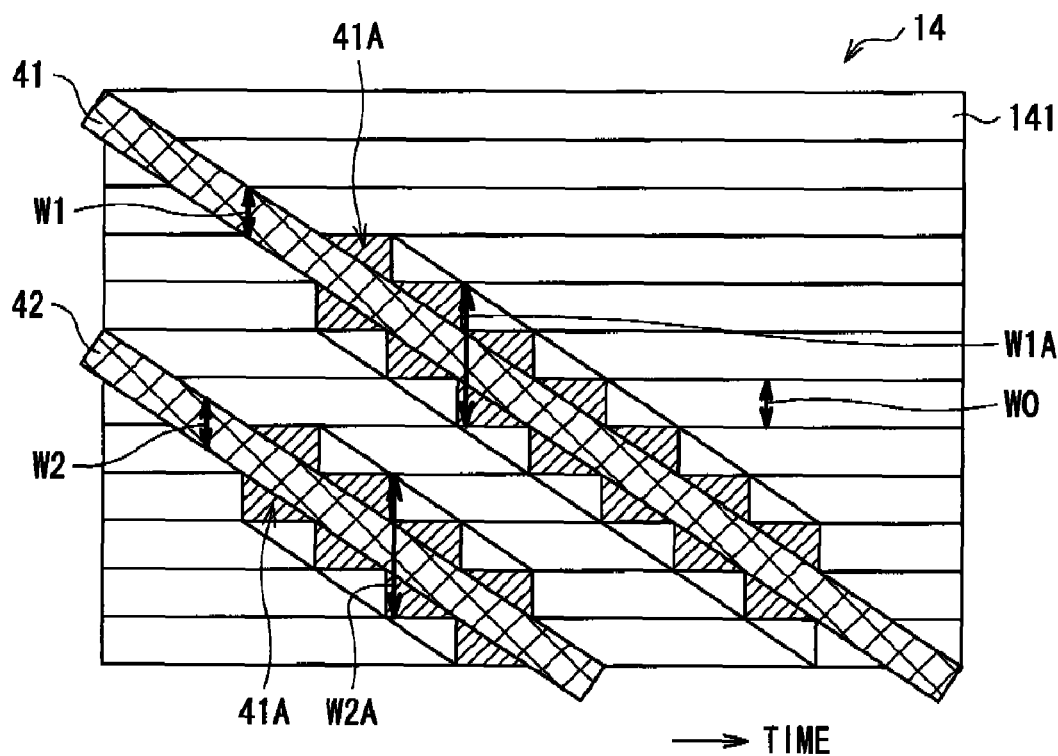
FIG. 3 is a schematic view for explaining the relationship between an irradiation line width and an actual color line width in the backlight system illustrated in FIG. 2.
Figure 4:
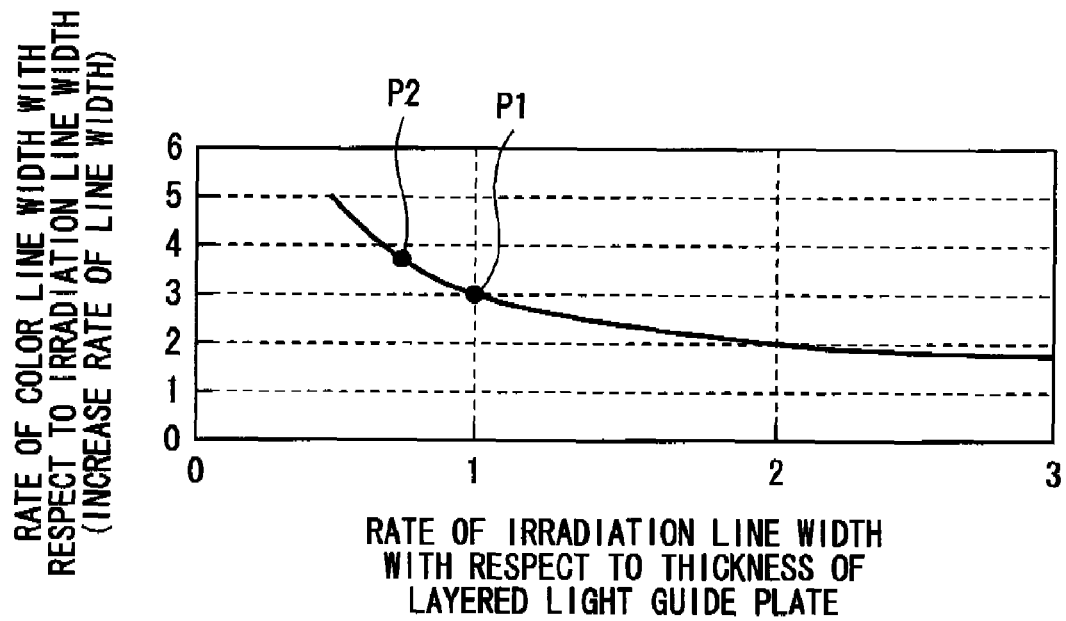
FIG. 4 is a characteristic diagram showing the relationship between the rate of the irradiation line width to the thickness of the layered light guide plates and the increasing rate of the line width.

The thickness of each of the layered light guide plates in the stacked light guide plate 14 is preferably as small as possible (that is, a number of stacked layers of the layered light guide plates in the stacked light guide plate 14 is preferably as many as possible). For example, at a time of the line-sequential irradiation operation by the red light Lr, the green light Lg, and the blue light Lb that will be described later, the thickness of each of the layered light guide plates is preferably smaller than the irradiation line width of each of color lights irradiated to the stacked light guide plate 14 from the light source section 10. This is because, in the case that the irradiation line width of each of the color lights irradiated from the light source section 10 to the stacked light guide plate 14 is W1 (=the thickness W0 of the layered light guide plates 141) or W2 (=0.7×W0) as, for example, in FIG. 3 illustrated by the relationship between the alignment lines and the time of each of the layered light guide plates 141 in the stacked light guide plate 14, in consideration that the irradiation line of each of the color lights performs the line sequence operation, the line width of each of the color lights (color line width) which is actually irradiated to the liquid crystal display panel 2 through the stacked light guide plate 14 is set as W1A (=3× W0) or W2A (=2.7×W0), that is, the increase rate of the color line width is suppressed as the thickness of each of the layered light guide plates 141 is small. Specifically, as illustrated in FIG. 4, when the irradiation line widths of each of the color lights are W1 and W2, the increase rate of the color line widths are represented as reference numerals P1 and P2, respectively. As understood from FIG. 4, the increase rate of the color line width for the reference numeral P1 is more suppressed in comparison with the case of the reference numeral P2, where P1 has the larger rate of the irradiation line width to the thickness of each of the layered light guide plates 141 in comparison with P2 (the thickness of each of the layered light guide plates 141 for the reference numeral P1 is smaller than the case of P2).

Next, with reference to FIG. 5, the configurations of drive sections and control sections of the liquid crystal display panel 2 and the light source section 10 will be described in detail. Here, FIG. 5 shows a block configuration of the liquid crystal display 3.

Figure 5:
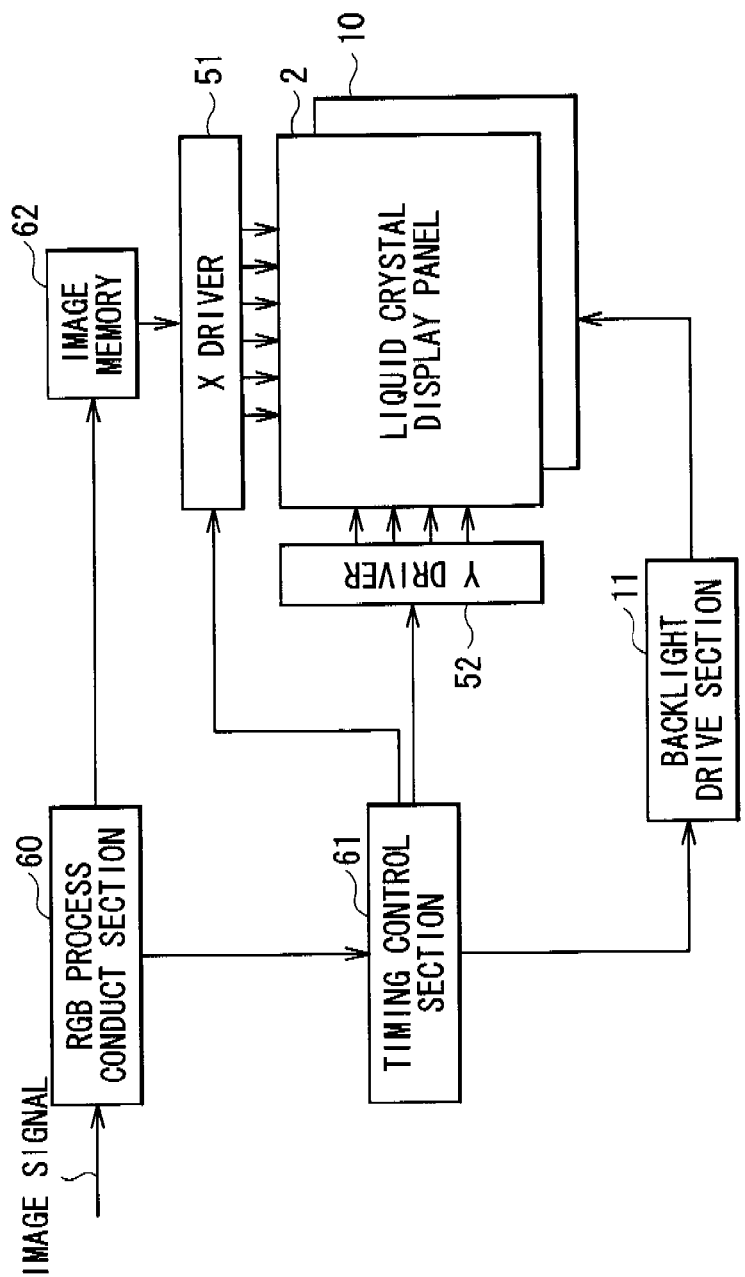
FIG. 5 is a block diagram showing the overall configuration of the liquid crystal display illustrated in FIG. 1.

As illustrated in FIG. 5, the drive circuit to display images by driving the liquid crystal display panel 2 includes an X driver (a data driver) 51 supplying the drive voltage on the basis of an image signal to each of the pixel electrodes 23 in the liquid crystal display panel 2, a Y driver (a gate driver) 52 line-sequentially driving, along scanning lines not shown in the figure, each of the pixel electrodes 23 in the liquid crystal display panel 2, a timing control section 61 controlling the X driver 51 and the Y driver 52, and a backlight drive section 11 that will be described later, an RGB process conduct section 60 generating RGB signals by conducting the externally fed image signals, an image memory 62 as a frame memory storing the RGB signals transmitted from the RGB process conduct section 60.

On the other hand, a driving and control section performing the line-sequential irradiation operation that will be described later by driving the light source section 10 of the backlight system 1 is applied to the timing control section 61 and the backlight drive section 11. Details (functions) of the timing control section 61 and the backlight drive section 11 will be described later.

Here, the backlight system 1 corresponds to a specific example of "the light source device" and "the irradiation means" of the present invention. The backlight drive section 11 corresponds to a specific example of "the light source drive means" of the present invention. The X driver 51, the Y driver 52 and the RGB process conduct section 60, the image memory 62, and the timing control section 61 correspond to a specific example of "the display drive means" of the present invention.

Figure 6:
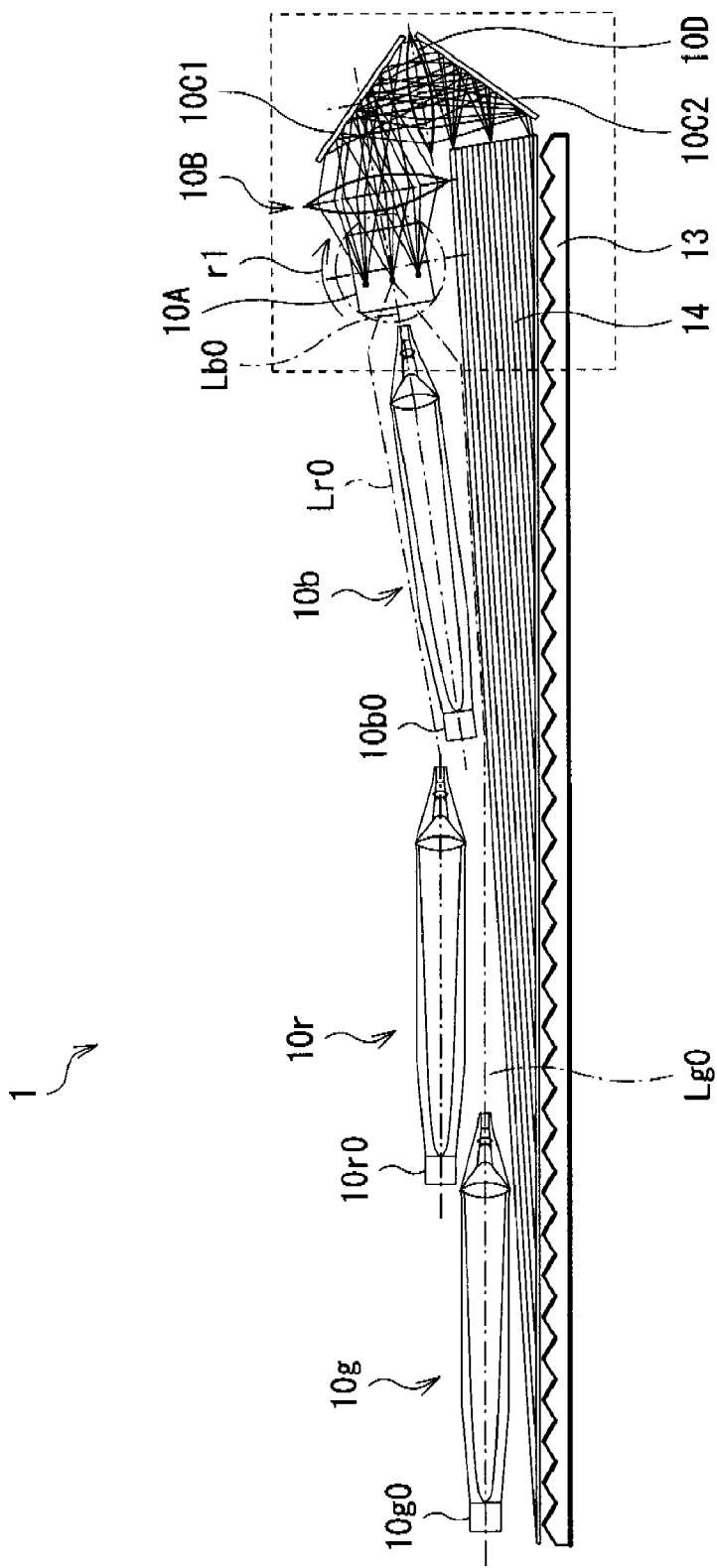
FIG. 6 is a cross-sectional view showing the detailed configuration example of the backlight system illustrated in FIG. 2.
Figure 7:
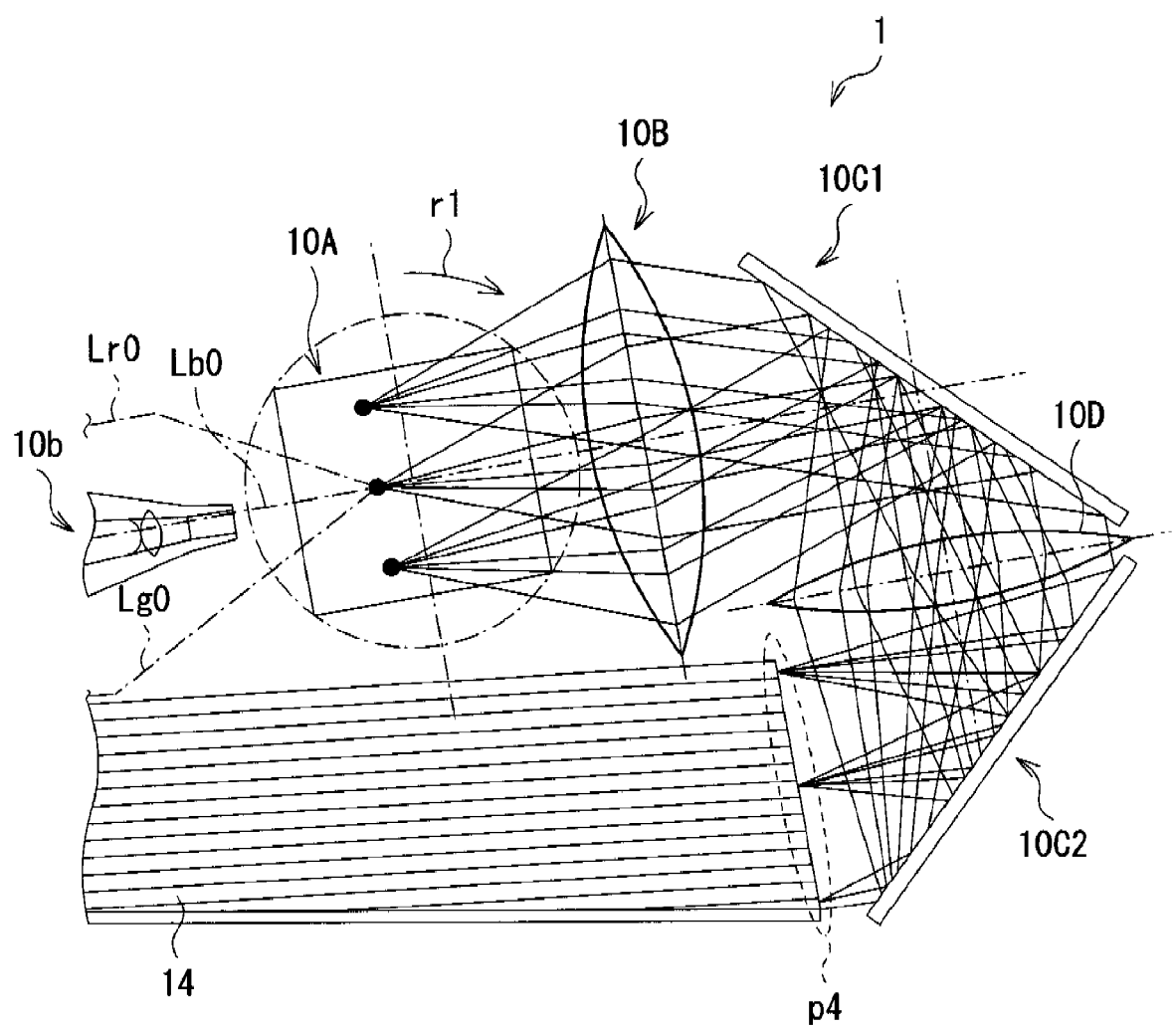
FIG. 7 is an enlarged cross-sectional view showing a part of the backlight system illustrated in FIG. 6.

Next, with reference to FIGS. 6 to 9, FIGS. 10A and 10B, and FIGS. 11 to 12, the detailed configuration of the light source section 10 in the backlight system 1 will be described. FIG. 6 shows a cross-sectional configuration of the backlight system 1 regarding the light source section 10. FIG. 7 shows in detail the region indicated by a reference numeral P3 in FIG. 6 in enlarged scale.

As illustrated in FIG. 6, the light source section 10 includes a green light irradiation section 10g, a red light irradiation section 10r and a blue light irradiation section 10b arranged side by side on the stacked light guide plate 14, a single polygon prism 10A which can separately bend each of the color lights irradiated from the green light irradiation section 10g, the red light irradiation section 10r and the blue light irradiation section 10b, and a focus lens 10B, a mirror 10C1, a focus lens 10D and a mirror 10C2 as an imaging optical system for imaging each of the color lights bended by the polygon prism 10A on the light entrance of the stacked light guide plate 14.

The red light irradiation section 10r has a red LED 10r0 emitting a red light. The red light irradiation section 10r irradiates, to the polygon prism 10A, the red light Lr0 as the red light collimated and compressed in the way that will be described later. Similarly, the green light irradiation section 10g has a green LED 10g0 emitting a green light. The green light irradiation section 10g irradiates, to the polygon prism 10A, the green light Lg0 as the green light collimated and compressed in the way that will be described later. Similarly, the blue light irradiation section 10b has a blue LED 10b0 emitting a blue light. The blue light irradiation section 10b irradiates, to the polygon prism 10A, the blue light Lb0 as the blue light collimated and compressed in the way that will be described later.

The polygon prism 10A is rotated, for example, in the way indicated with a reference numeral r1 in FIG. 6 and FIG. 7 so that the green light Lg0, the red light Lr0, and the blue light Lb0 respectively irradiated by the green light irradiation section 10g, the red light irradiation section 10r, and the blue light irradiation section 10b are separately bended. Here, the polygon prism 10A is tetrahedrally configured. The detailed configuration and the bend operation of the polygon prism 10A will be described later.

The focus lens 10B focuses, in the direction of the mirror 10C1, each of the color lights bended by the polygon prism 10A. The mirror 10C1 reflects, in the direction of the focus lens 10D, each of the color lights focused by the focus lens 10B. The focus lens 10D focuses, in the direction of the mirror 10C2, each of the color lights reflected by the mirror 10C1. The mirror 10C2 reflects, in the direction of the light entrance of the stacked light guide plate 14, each of the color lights focused by the focus lens 10D in order to image each of the color lights on an entrance section P4.

Figure 8:
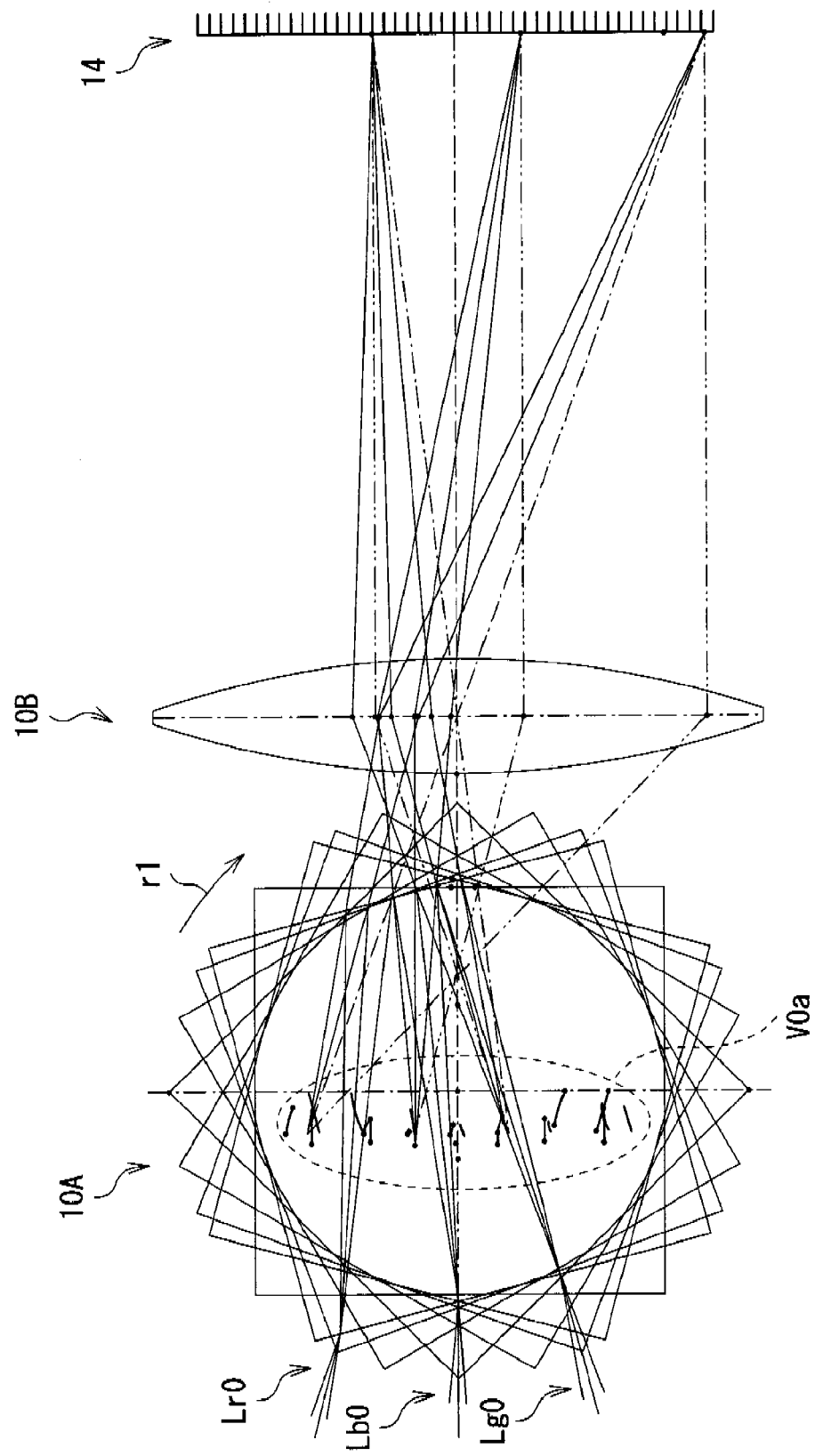
FIG. 8 is a cross-sectional view for explaining the detailed configuration of a polygon prism and a focus lens illustrated in FIG. 6 and FIG. 7.

When a part of the imaging optical system (the mirror 10C1, the focus lens 10D and the mirror 10C2) is omitted, the configuration is, for example, as indicated by the cross section in FIG. 8. As understood from FIG. 8, in the green light Lg0, the red light Lr0 and the blue light Lb0, an light axis of one color light (in this case, the blue light Lb0) is arranged in line-symmetry with respect to the light axes of other color lights (in this case, the red light Lr0 and the green light Lg0).

Figure 9:
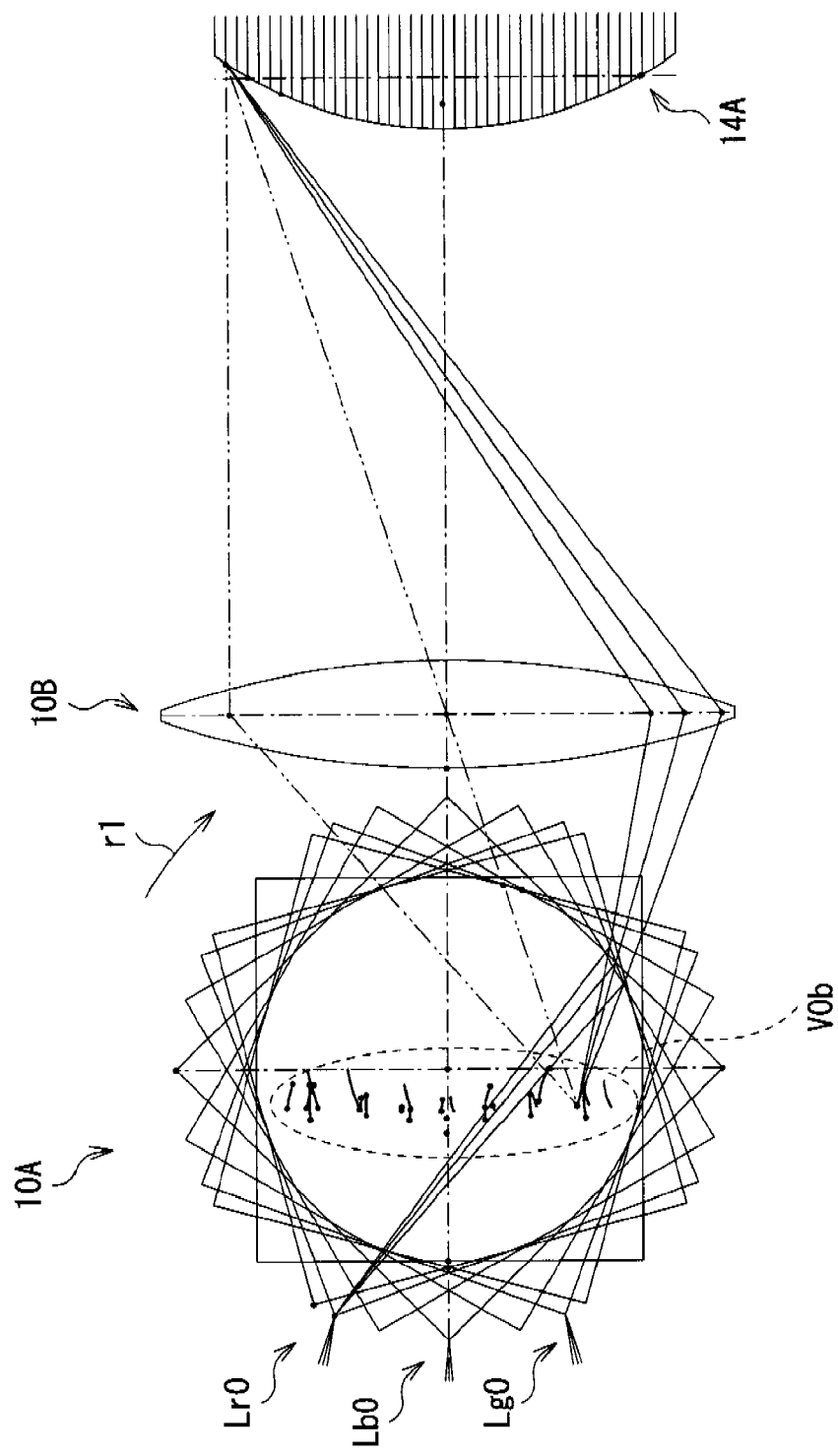
FIG. 9 is a cross-sectional view showing another configuration example of the polygon prism and the focus lens.
Figure 11:
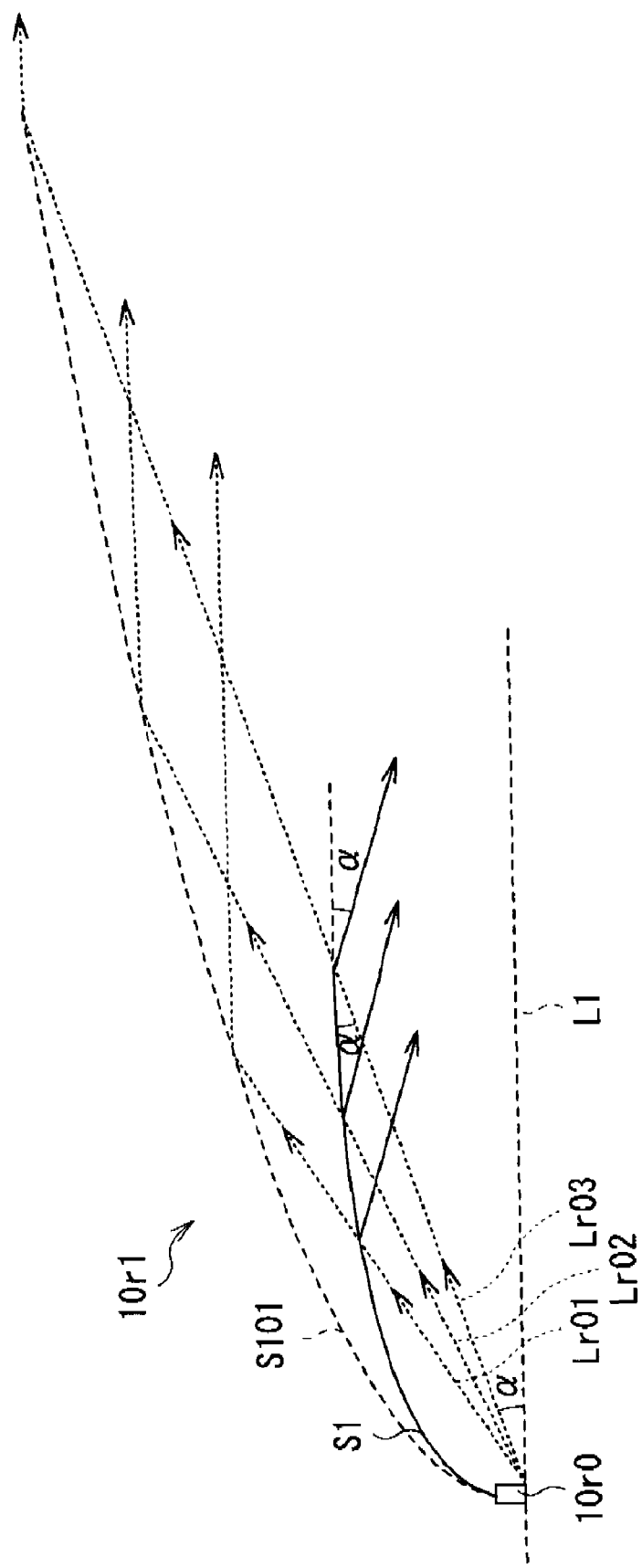
FIG. 11 is a schematic view for explaining the detailed configuration of a collimated light generation section illustrated in FIGS. 10A and 10B.

Each of the color lights is bended by the polygon prism 10A rotating, for example, similarly to the reference numeral r1 in FIG. 8, and focused to the focus lens 10B so that each of the color lights is separately and line-sequentially irradiated to the entrance of the stacked light guide plate 14. In the case that each of the color lights is not orthogonally entered into the entrance face of a stacked light guide plate 14A as illustrated in FIG. 9, the entrance preferably has a convex surface, similarly to the stacked light guide plate 14A of FIG. 9. Because a number of reflections is decreased as an angle of the incident light approaches in the light guide direction of the stacked light guide plate, the transmission loss can be decreased. Reference numerals V0a and V0b illustrated in FIGS. 8 and 9 respectively show a locus of virtual image points (virtual image curves) of the green light Lg0, the red light Lr0 and the blue light Lb0, when the polygon prism 10A is rotated.

Next, with reference to FIGS. 10A, 10B, 11 and 12, the detailed configuration of the red light irradiation section 10r indicated in FIG. 6 is described. Here, FIG. 10A shows the cross-sectional configuration of the red light irradiation section 10r, and FIG. 10B shows an arrow cross-sectional configuration as viewed from arrow II-II of FIG. 10A. The green light irradiation section 10g and the blue light irradiation section 10b shown in FIG. 6 and the red light irradiation section 10r shown in FIGS. 10A and 10B have the similar configurations so that the description will be omitted.

The red light irradiation section 10r includes the above-mentioned red LED10r0, a collimated light generation section 10r1 including curves S1 and S2, a collimated light compression section 10r2. In the red light irradiation section 10r, the red LED10r0, the collimated light generation section 10r1 and the collimated light compression section 10r2 are integrally formed.

The collimated light generation section 10r1 uses the curves S1 and S2 so that the red light emitted by the red LED10r0 is made substantially collimated. Specifically, for example similarly to the curve S1 illustrated by the cross-sectional schematic view of FIG. 11, the curves S1 and S2 reflects, at a reflection angle of n degree, a light ray diffused in a direction of the angle (for example, an angle n satisfying $\alpha \leq n < 90°$) equal to or larger than an angle $\alpha$ (for example, $\alpha = 4°$, while satisfying $0° < \alpha < 90°$) as a predetermined threshold value with respect to the central axis L1 of light flux, where the light ray is of the light flux of the red light emitted from the red LED10r. That is, for example, light rays Lr01, Lr02 and Lr03 having the angles (emission angles) equal to or larger than the angle $\alpha$ with respect to the central axis L1 are reflected at angles equal to these emission angles in the curve S1 (for example, the light ray Lr03 emitted from the worst-case position of the red LED10r0 at the emission angle $\alpha$ are reflected at the reflection angle $\alpha$ in the curve S1). This enables the light ray of each of the red lights to be emitted from the collimated light generation section 10r1, as a substantially collimated light traveling at the emission angle smaller than the threshold angle $\alpha$. Therefore, miniaturization of the collimated light generation section 10r is enabled in comparison with, for example, the parabola mirror curve S100 illustrated in FIG. 11 (for example, the width is made approximately 64% smaller and the length is made approximately 2% smaller). The red light originally emitted from the red LED 10r0 at the angle equal to or smaller than the threshold value angle is not reflected at the curves S1 and S2, and emitted from the collimated light generation section 10r1 as it is.

Figure 12:
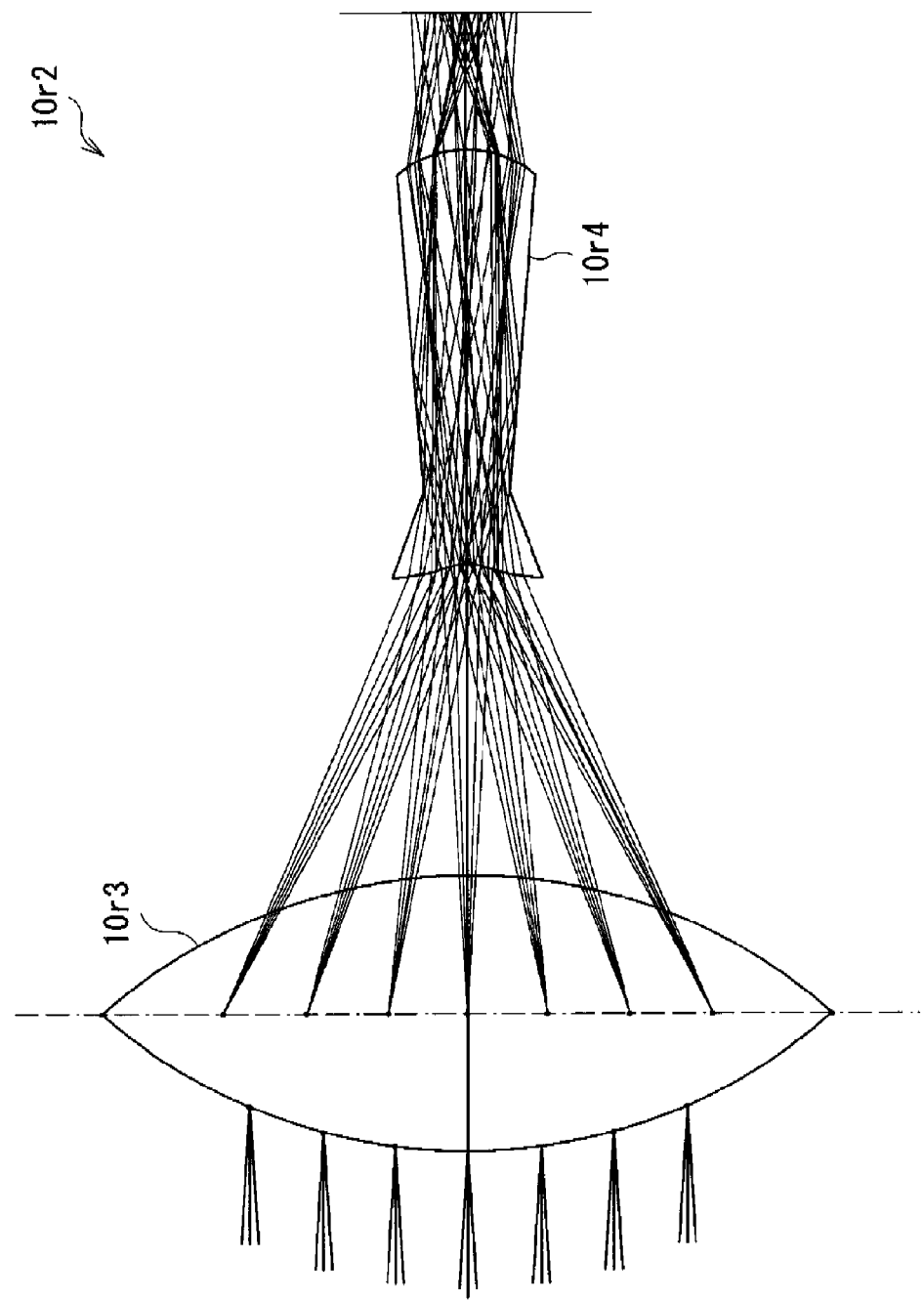
FIG. 12 is a cross-sectional view for explaining the detailed configuration of a collimated light compression section illustrated in FIGS. 10A and 10B.

For example, as illustrated in FIG. 12, the collimated light compression section 10r2 includes a focus lens 10r3 (a first focus optical system) focusing the red light which is substantially collimated by the collimated light generation section 10r1, and a compression section 10r4 compressing and outputting the focused red light. For example, as illustrated in FIG. 12, the compression section 10r4 is composed of an optical system disposed so as to compress the substantially collimated light (similar to the reversed configuration of an expander of laser light). Alternatively, the compression section 10r4 may be composed by using the principles of microscope. Further, the compression section 10r4 may be provided with a plurality of such collimated light compression sections 10r2 having a multiple-stage configuration. In such a configuration, the configuration of the light source section 10 can be further miniaturized by further compressing the substantially collimated light.

Next, the operation of the backlight system 1 and the liquid crystal display 3 of the embodiment will be described in detail.

With reference to FIGS. 1 to 5, the basic operation of the backlight system 1 and the liquid crystal display 3 in the embodiment will be described.

In the backlight system 1, the irradiation light Lout of the red light Lr, the green light Lg, and the blue light Lb is respectively and separately irradiated to the liquid crystal panel 2 from the light source section 10 by the backlight drive section 11 which performs the driving operation of the light source section 10.

On the other hand, in the whole liquid crystal display 3, the irradiation light Lout from the light source section 10 is modulated in the liquid crystal layer 20 by the drive voltage outputted to a pixel electrode 23 from the X driver 51 and the Y driver 52 on the basis of the image signal, and outputted as the display light Dout from the liquid crystal panel 2. In this way, the backlight system 1 functions as a backlight of the liquid crystal display 3 (irradiation means for liquid crystal), and this enables the image display by the display light Dout.

Specifically, following the control by the timing control section 61, the pixel gate pulse is applied from the Y driver 52 to the gate of the TFT devices in a collimated line in the liquid crystal panel 2, and the drive voltage is applied on the basis of the image signal, to the pixel electrode 23 of that horizontal line from the X driver 51. This enables the image display on the basis of the image signal in the liquid crystal display 3.

Next, with reference to FIGS. 1 to 5, additionally to FIGS. 6 to 9, 10A, and 10B, and FIGS. 13 to 18, 19A, 19B, 20 and 21, the irradiation operation by the backlight system 1 (especially the light source section 10) will be described in detail.

As illustrated in FIG. 6, the red light Lr0, the green light Lg0, and the blue light Lb0 respectively and substantially collimated and compressed are emitted from the red light irradiation section 10r, the green light irradiation section 10g, and the blue light irradiation section 10b, and are separately entered into the polygon prism 10A rotating, for example, in the way of the reference numeral r1. Specifically, for example in the red light irradiation section 10r, as illustrated in FIG. 10A, the red light emitted by the red LED 10r0 is substantially collimated in the collimated light generation section 10r1 including the curves S1 and S2, compressed in the collimated light compression section 10r2, and then outputted. In the green light irradiation section 10g and the blue light irradiation section 10B, the same operations are performed and the green light Lg0 and the blue light Lb0 are substantially collimated, compressed and then outputted, respectively.

Figure 13:
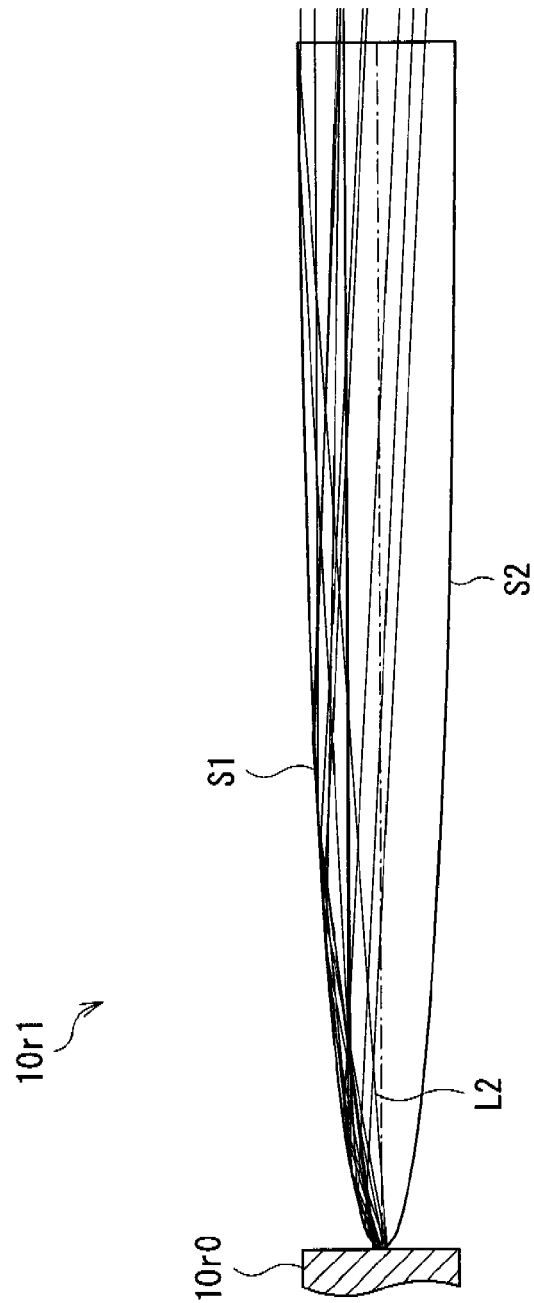
FIG. 13 is a cross-sectional view for explaining the operation of the collimated light generation section.
Figure 14:
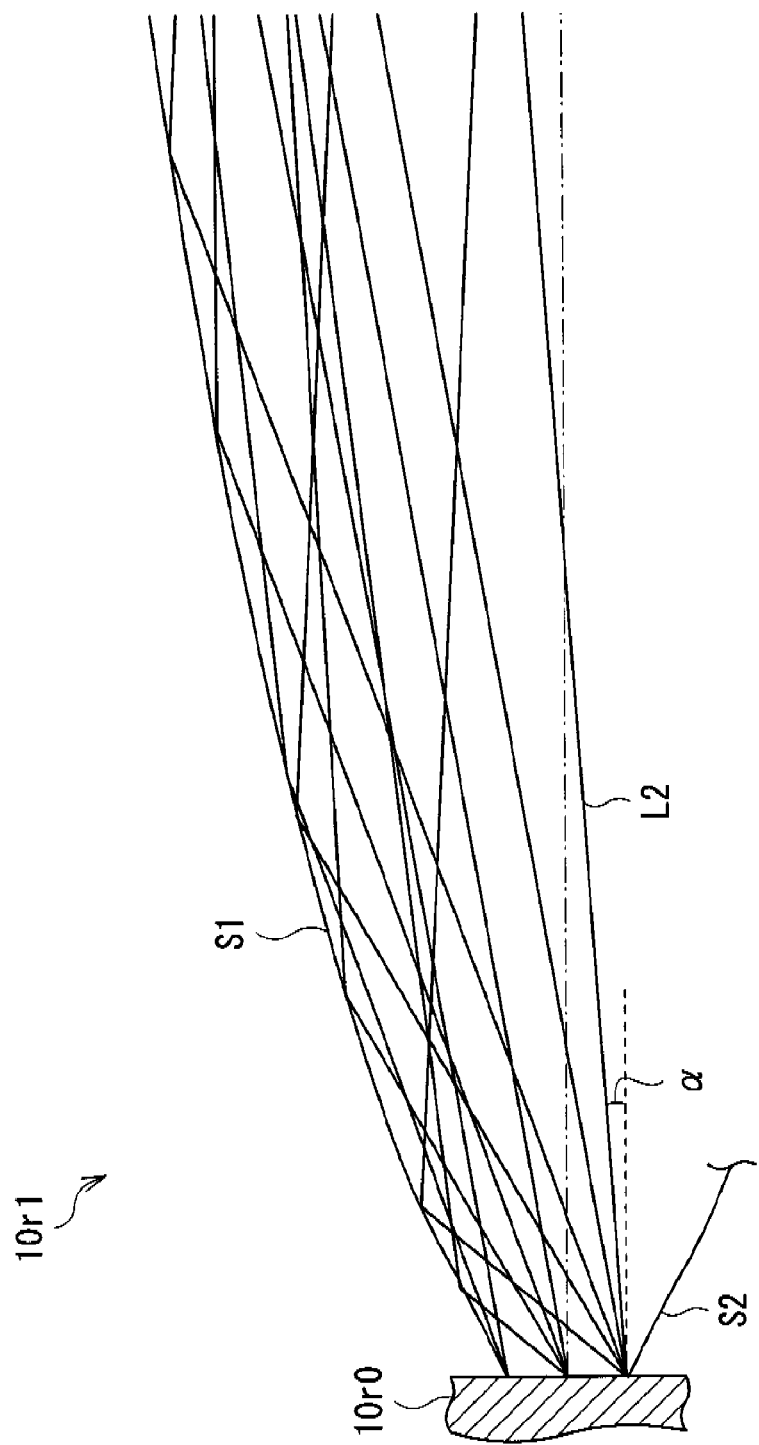
FIG. 14 is an enlarged cross-sectional view showings a part of the configuration illustrated in FIG. 13.

In this case, in the collimated light generation section 10r1, for example as illustrated in FIG. 13 and FIG. 14 (a partly enlarged view of FIG. 13), the light ray emitted from the red LED 10r0 to inside the closed space configured by a straight line L2, the curve S1, and the light emission plane of the red light LED 10r0 are all reflected on the curve S1 and outputted, where the straight line L2 as an upward line starting from the lowest point of the red LED 10r0 forms the abovementioned threshold angle α. In the collimated light compression section 10r2, for example as illustrated in FIG. 12, the red light substantially collimated in the collimated light generation section 10r1 is focused inside the compression section 10r4 by the focus lens 10r3. In the compression section 10r4, the focused red light is compressed and emitted as the red light Lr0 to the polygon prism 10A.

Next, as illustrated in FIGS. 7 and 8, the red light Lr0, the green light Lg0, and the blue light Lb0 separately entered into the polygon prism 10A are respectively focused by the focus lens 10B, reflected at the mirror 10C1, focused by the focus lens, and reflected at the mirror 10C2. Accordingly, the red light Lr0, the green light Lg0, and the blue light Lb0 are imaged in the light entrance section of the stacked light guide plate 14 as shown as a reference numeral P4 in FIG. 7 and are separately entered into inside the stacked light guide plate 14.

In this case, as illustrated in FIG. 7, because the polygon prism 10A is rotated, the incident angle of the red light Lr0, the green light Lg0 and the blue light Lb0 which are separately entered are occasionally changed and accordingly the bend angle of each of the color lights is changed. Therefore, because the rotation operation of the polygon prism 10A is controlled by the driving operation of the backlight drive section 11, the incidence position of each of the color lights entering into the stacked light guide plate 14 is line-sequentially changed. As a result, for example as illustrated in FIG. 2, each of the color lights Lr, Lg and Lb separately irradiated to the liquid crystal display panel 2 through the stacked light guide plate 14 and the prism sheet 13 performs the line-sequential irradiation operation. This line-sequential irradiation operation will be described later in detail.

In this way, each of the substantially collimated color lights Lr, Lg and Lb is separately emitted, and separately and line-sequentially irradiated to the liquid crystal display panel 2 through the light guide plate 14 and the prism sheet 13.

With reference to FIGS. 15 to 18, 19A, 19B, 20 and 21, the relationship between the configuration and the bend operation of the polygon prism 10A will be described in detail. FIGS. 15 to 18, 19A, 19B, 20 and 21 respectively illustrate the aspects of locus of virtual image points (virtual image curves) of the green light Lg0 and the red light Lr0 in the polygon prism 10A. In this case, the locus of the virtual image points (virtual image curves) of the blue light Lb0 is similar to the one being line-symmetric to the locus of the virtual image points of the red light Lr0 with respect to the light axis of the green light Lg0 so that the description will be omitted.

Figure 15:
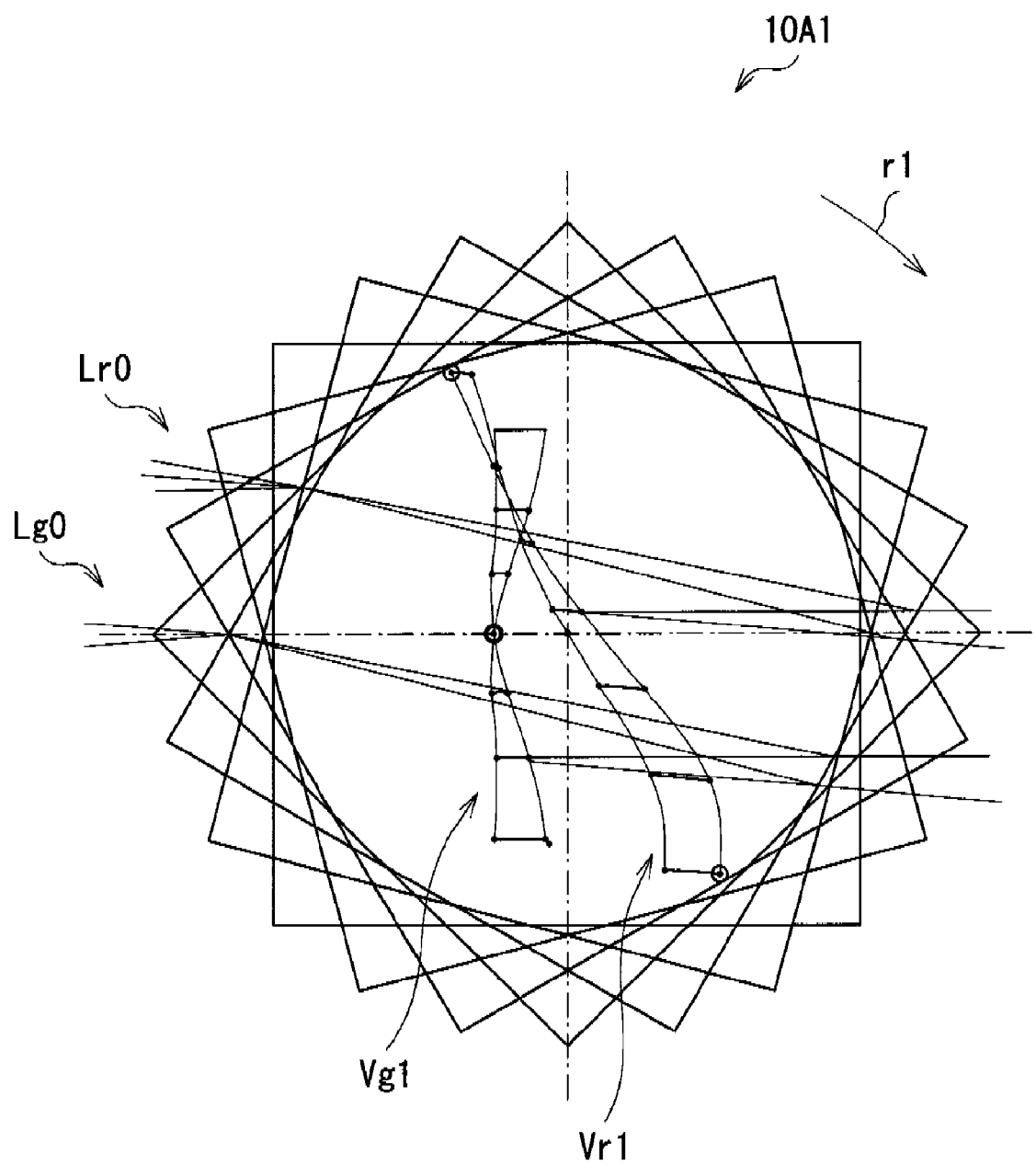
FIG. 15 is a cross-sectional view for explaining an example of the configuration and the operation of the polygon prism.

For example, as in a polygon prism 10A1 of FIG. 15, in the case that the angle formed by the light axis of one color light (in this case, the green light Lg0) and the light axis of another color light (in this case, the red light Lr0) defines the incidence position of another color light with respect to the polygon prism, the incidence position of another color light is located in the position (because the polygon prism is constantly rotated, the position is calculated by a consideration that the time difference for each of the color lights should be uniform when each of the color lights disappears below the screen and appears above the screen. The changeover between above and below is performed on an apical angle portion of the polygon prism so that the position when a vertex reaches the angle defined by equation (1) is the incidence position) calculated by the theoretical incident angle which is defined by following equation (1). Also, a light path of each of the color lights is set so that each of the color lights is entered into the horizontal direction toward the theoretical incidence position. In this case, the polygon prism (even-gon) has the entrance plane and exit plane collimated to each other so that the light is shifted in collimation. Accordingly, it is the most natural idea that the light is entered in the horizontal direction as described above. Here, the case is considered where each of the color lights entering into the polygon prism 10A1 is an ideal collimated light. In this case, the theoretical incidence position angle of the red light Lr0 is represented as (360°/4)/3=30°(Basically, the order of the light rays entering into the polygon prism can be set freely. However, here, it will be supposedly described as the arrangement is in order of the red light, the green light, and the blue light from the top). The loci of virtual image points (virtual image curves) Vr1 and Vg0 of the red light Lr0 and the green light Lg0 by the rotation of the polygon prism 10A1 are as illustrated in FIG. 15, respectively. The positions of each of the virtual images are widely apart from each other. Therefore, when the line-sequential irradiation operation is performed with respect to the liquid crystal display panel 2, the position shift of each of the color lights is increased.

(theoretical incident angle)=360°/(a number of planes of polygon prism polyhedron)/(a number of color lights)     (1)

Figure 16:
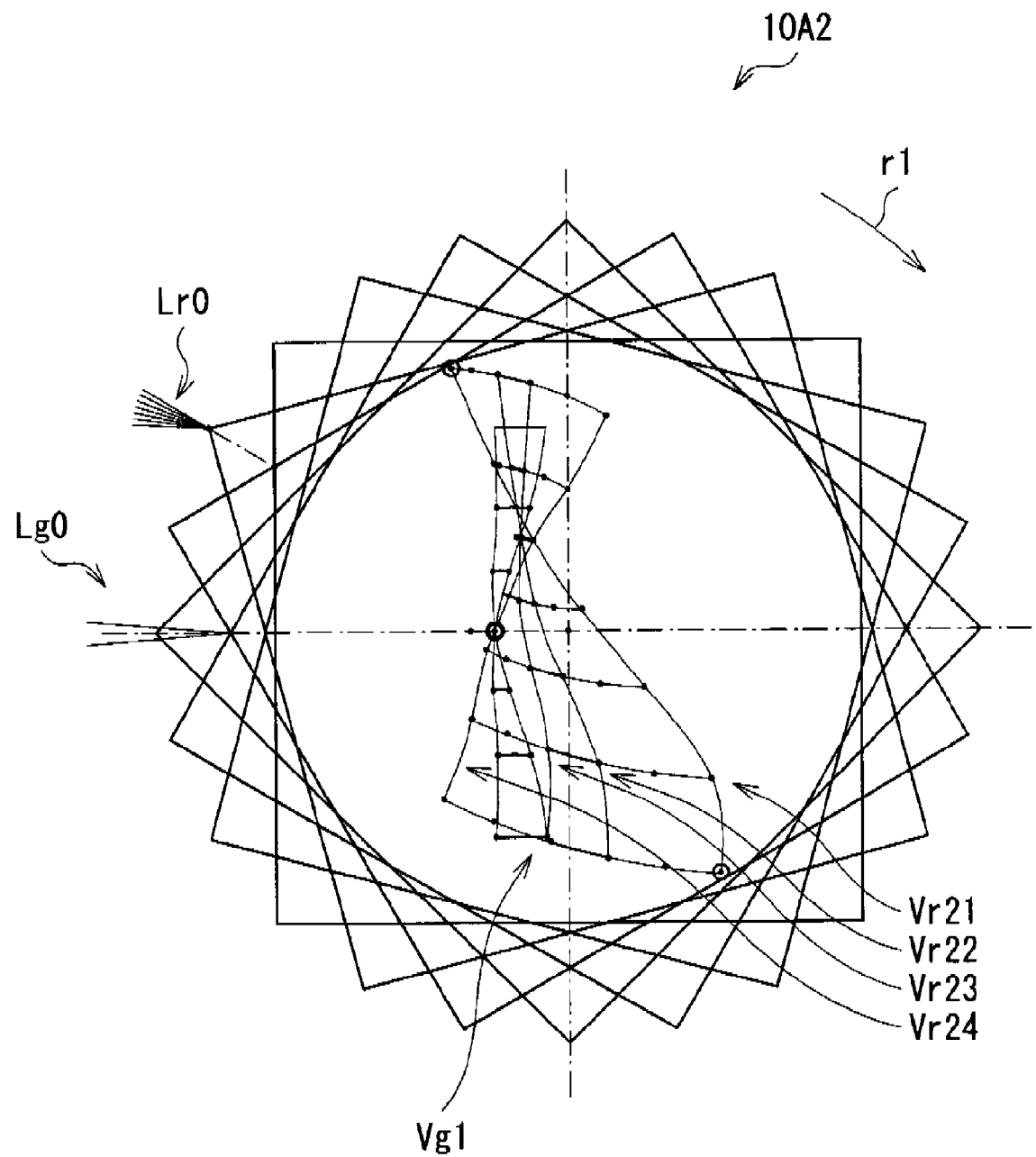
FIG. 16 is a cross-sectional view for explaining another example of the configuration and the operation of the polygon prism.

For this reason, for example in a polygon prism 10A2 shown in FIG. 16, the incident angle of the red light Lr0 directed toward the theoretical incidence position is changed so as to be directed toward the central point of the polygon prism 10A2 (directed downward). Specifically, a virtual image curve Vr21 shows the case where the incident angle of the red light Lr0=0°(horizontal direction), the virtual image curve Vr22 shows the case where the incident angle of the red light Lr0=5°, the virtual image curve Vr23 shows the case where the incident angle of the red light Lr0=10°, and the virtual image curve Vr24 shows the case where the incident angle of the red light Lr0=20°. Therefore, in FIG. 16, as the incident angle of the red light Lr0 is decreased in the collimated direction and approaches the central axis of the polygon prism 10A2, the position of the virtual image curve of the red light Lr0 approaches the position of a virtual image curve Vg1 of the green light Lg0, and approaches the closest when the incident angle is between approximately 10° and 20°.

Figure 17:
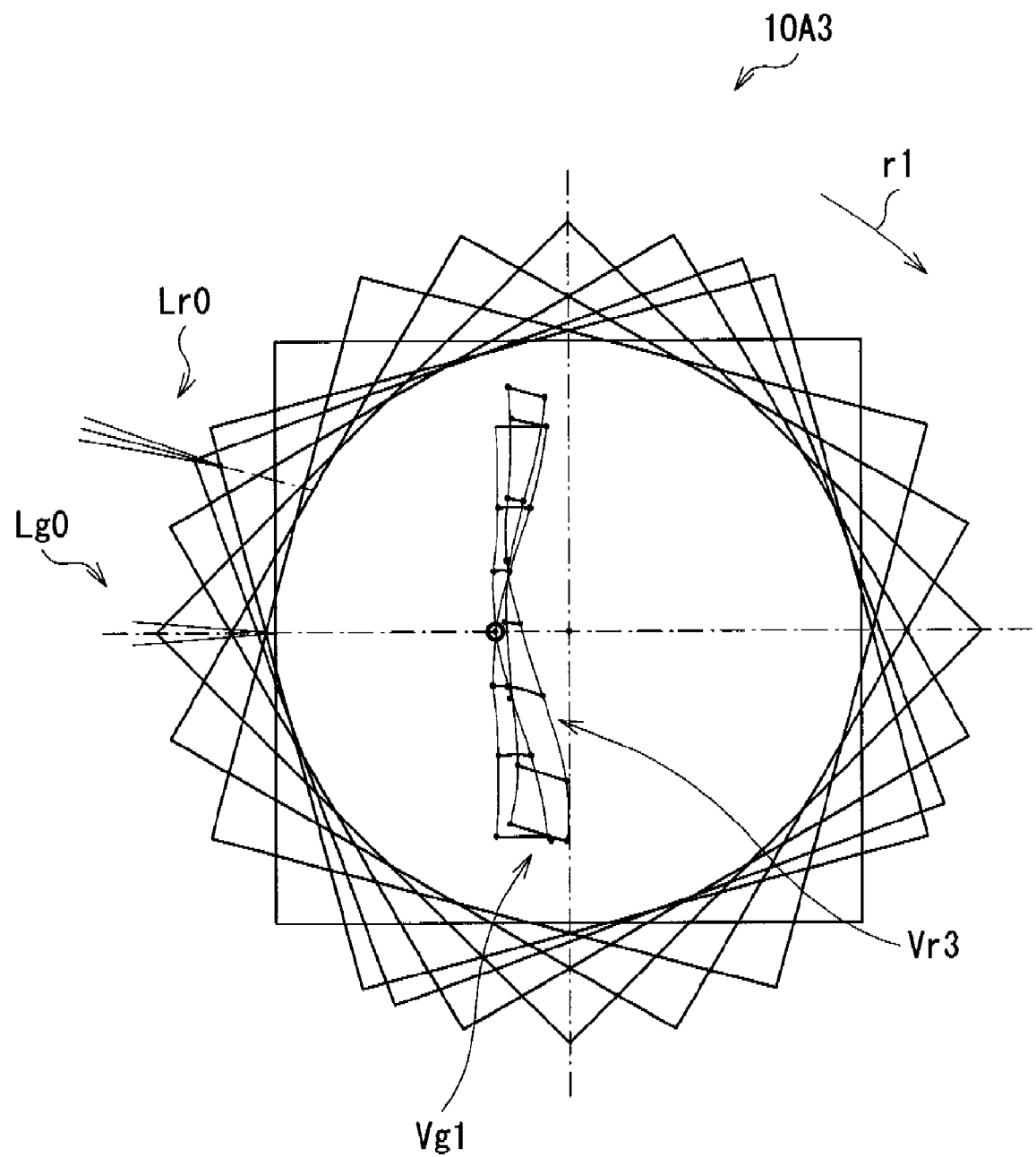
FIG. 17 is a cross-sectional view for explaining another example of the configuration and the operation of the polygon prism.

Further, for example in a polygon prism 10A3 as illustrated in FIG. 17, the incidence position of the red light Lr0 is set so that the angle of the incidence position of the red light Lr0 to the polygon prism 10A3 is made smaller (in FIG. 17, it is 25° as an example) than the theoretical incident angle (in this case, 30°) defined by the above equation (1). The light path of the red light Lr0 is defined correspondingly. Therefore, if the light path of the red light Lr0 is set so that the angle of the incidence position of the red light Lr0 satisfies the above, the position of the virtual image curve Vr3 of the red light Lr0 approaches more to the position of the virtual image curve Vg1 of the green light Lg0. As a result, when the line-sequential irradiation operation is performed with respect to the liquid crystal display panel 2, the position shift of each of the color lights is suppressed more.

Figure 18:
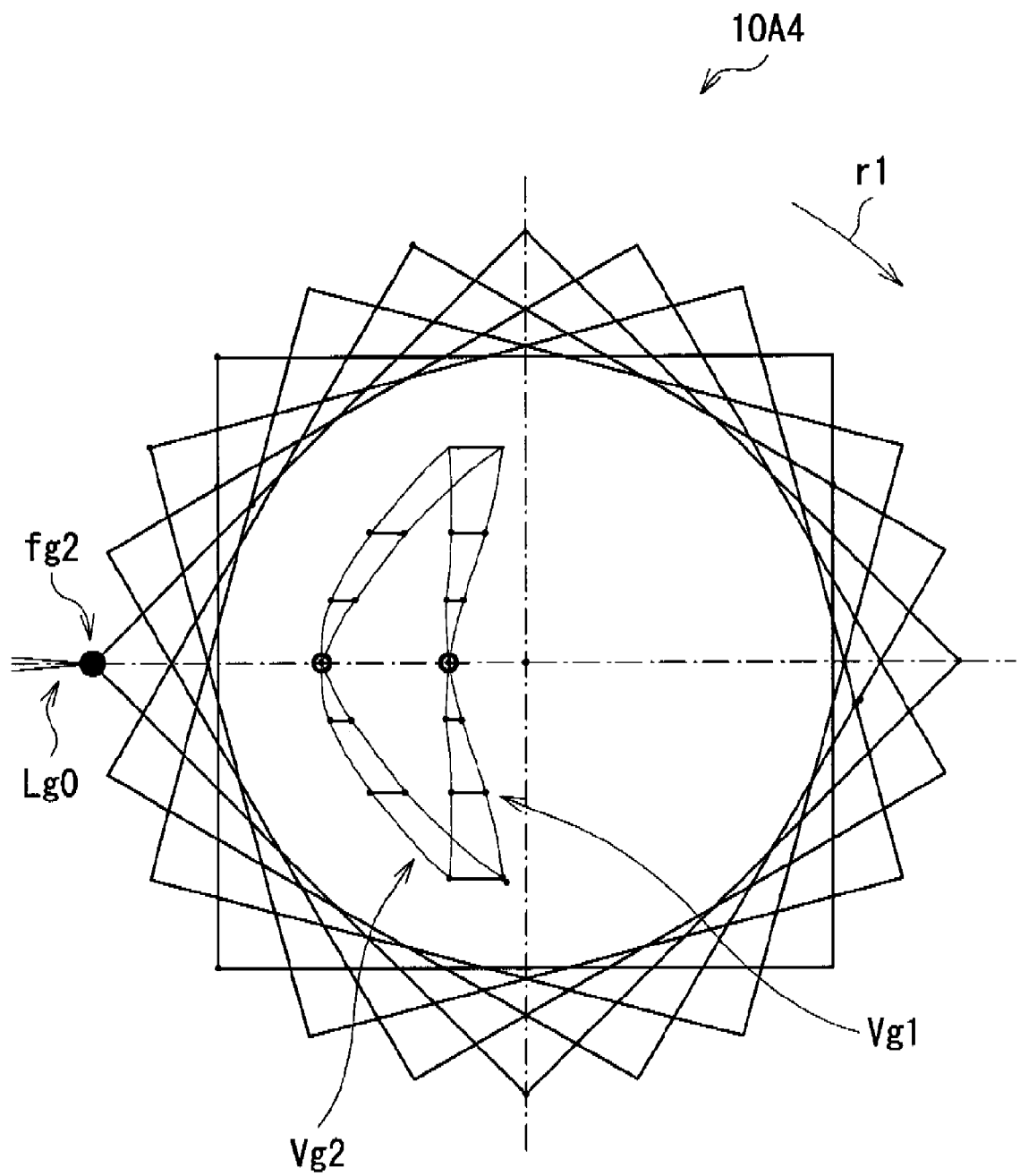
FIG. 18 is a cross-sectional view for explaining another example of the configuration and the operation of the polygon prism.

The above is the actual usage of the polygon prism with respect to the collimated light rays as being substantially ideal. However, it is considered that the case where the ideal collimated light rays are usable as the light source is actually rare. Thus, unlike the cases of FIGS. 15 to 17, in the case that each of the color lights entering into the polygon prism is a pseudo collimated light, (for example, in the case of a substantially collimated light generated by the collimated light generation section 10r1 or the like), the following is considered. For example as illustrated in FIG. 18, in the case that a focus point fg2 of the green light Lg0 that is a substantially collimated light is located in the position of the end face of a polygon prism 10A4, it is understood that the position of a virtual image curve Vg2 (especially, the position in the vicinity of the light axis of the green light Lg0 on the virtual image curve Vg2 (the position of central virtual image point)) is widely sifted to the incidence side from the position of the virtual image curve Vg1 of the case of the ideal collimated light. Therefore, in this case, the position of the central virtual image point of the red light Lr0 and the blue light Lb0, and the position of the central virtual image point of the green light Lg0 are widely shifted so that, at the time of the line-sequential irradiation operation, the position shift of each of the color lights with respect to the liquid crystal display panel 2 is increased in comparison with the case of the ideal collimated light.

Figure 19A:
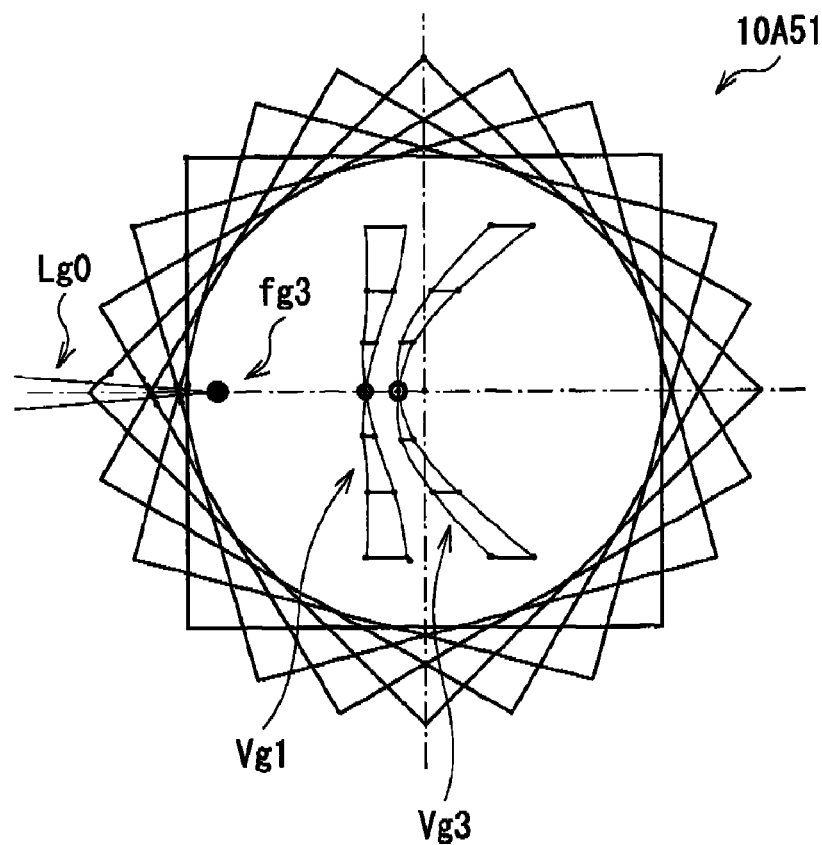
FIGS. 19A and 19B are cross-sectional views for explaining another example of the configuration and the operation of the polygon prism.
Figure 19B:
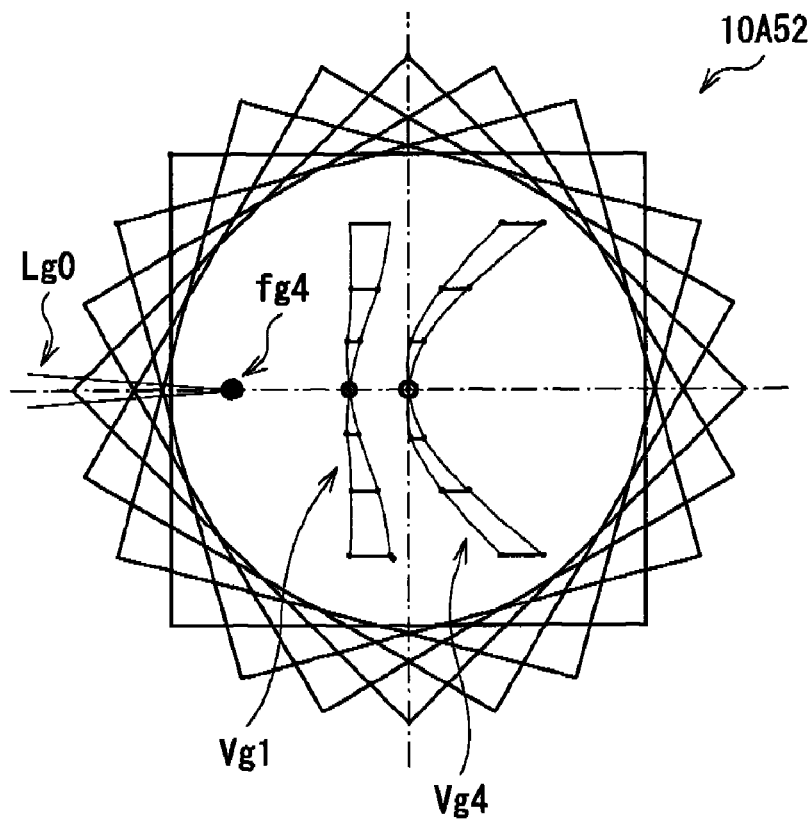
Figure 20:
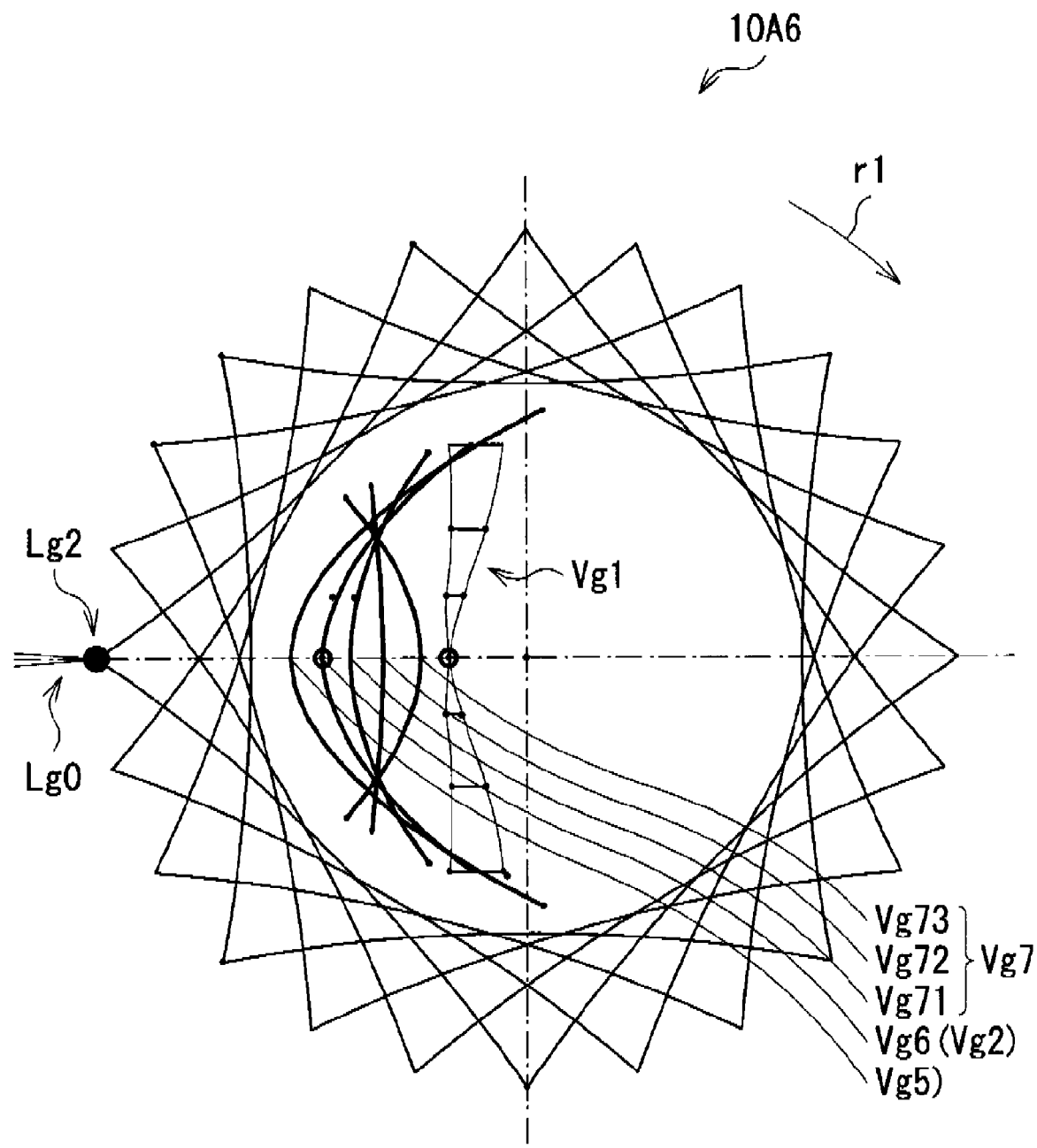
FIG. 20 is a cross-sectional view for explaining another example of the configuration and the operation of the polygon prism.

As measures to solve such an issue, for example, in polygon prisms 10A51 and 10A52 of FIGS. 19A and 19B, the focus optical system (for example, the focus lens; not shown in the figure) focusing the light so that the focus point of the green light Lg0 is located between the surface (end face) of the polygon prism and the central axis of the polygon prism is further provided in the previous step of the polygon prism, and the focus position of the green light Lg0 approaches the central axis of the polygon prism as the focus position of the green light Lg0 is changed from the focus position fg2 as in FIG. 18 to the focus position fg3 as in FIG. 19A, and then to the focus position fg4 as in FIG. 19B. In such a case, when the virtual image curve of the green light Lg0 is shifted from the virtual image curve Vg2 as illustrated in FIG. 18 to a virtual image curve Vg3 as illustrated in FIG. 19A, and then to a virtual image curve Vg4 as illustrated in FIG. 19B, it is understood that the shape of the virtual image curve is not displaced and is maintained, and the position of the central virtual imaginary point is shifted from the incidence direction to the central axis direction of the polygon prism. Therefore, the shift of the green light Lg0 toward the incidence side of the central virtual imaginary point position due to that each of the color lights is the pseudo collimated light is suppressed. As a result, during the line-sequential irradiation operation with respect to the liquid crystal display panel 2, the position shift of each of the color lights is suppressed.

Although a control method of the position of virtual image curve is indicated in the above, the shape of the virtual image curve is not appropriate for the purpose. Thus, for example, in a polygon prism 10A6 illustrated in FIG. 20, the shape of the end face of the polygon prism is further changed from flat to curve, and the shape of the virtual image curve itself of the green light Lg0 is also transformed. Specifically, a virtual image curve Vg5 corresponds to the case where the end face of the polygon prism is convex shaped, a virtual image curve Vg6 (=Vg2) corresponds to the case where the end face of the polygon prism is flat as described in the above, and a virtual image curve Vg7 corresponds to the case where the end face of the polygon prism is concave shaped, respectively. In the virtual image curve Vg7, a curvature of the concave surface is increased in order of the virtual image curve Vg71, the virtual image curve Vg72, and the virtual image curve Vg3. Therefore, when the end face of the polygon prism 10A6 is concavely shaped and its curvature is adjusted, the virtual image curve of the green light Lg0 is transformed (specifically, the position of the central virtual imaginary point is transformed to be directed in the central axis direction of the polygon prism), and this enables the virtual image curve of the green light Lg0 to approach the shape of the virtual image curve Vg1 where the green light Lg0 is ideal collimated light.

Figure 21:
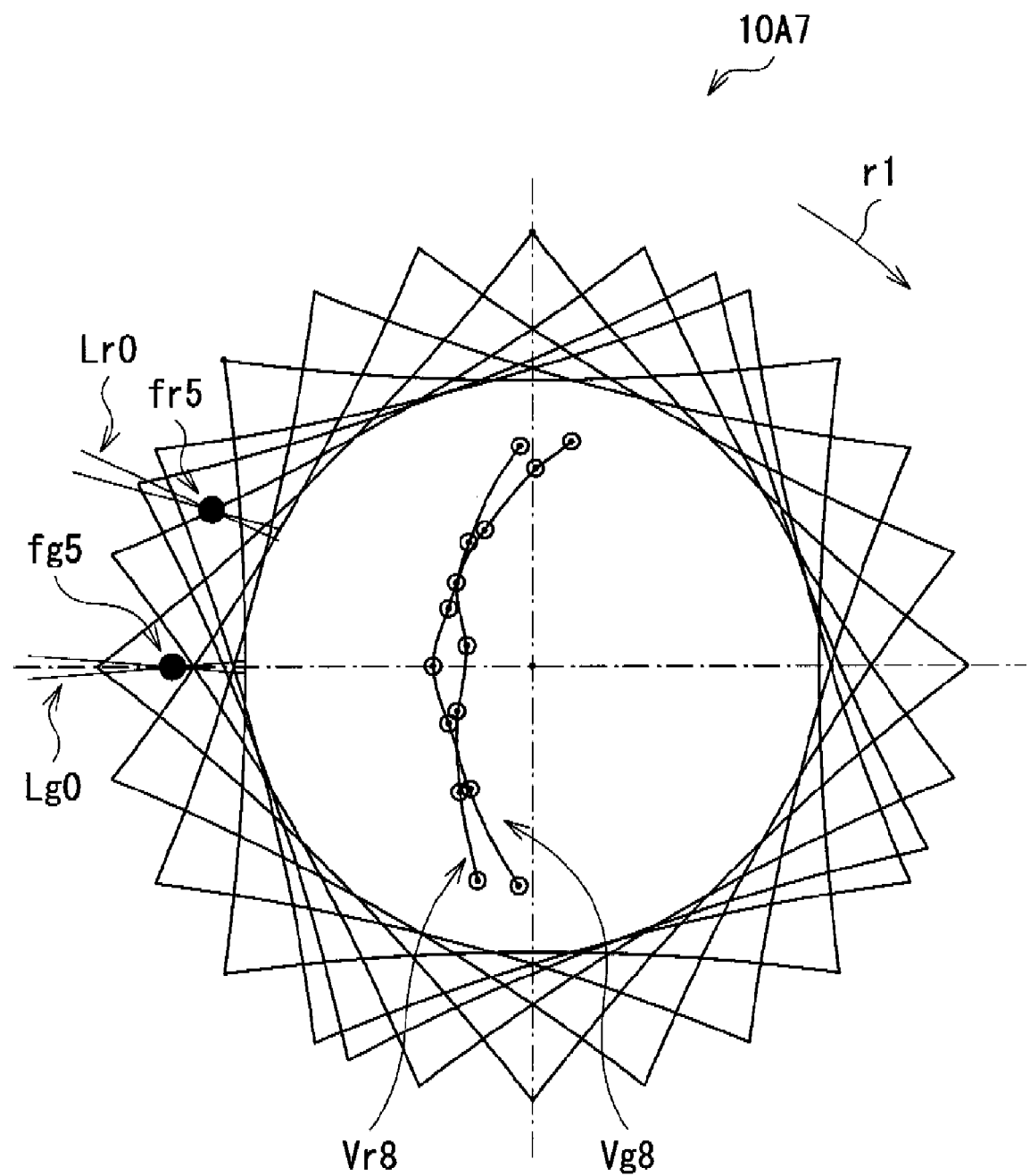
FIG. 21 is a cross-sectional view for explaining another example of the configuration and the operation of the polygon prism.

In this way, even in the case that each of the color lights entering into the polygon prism is pseudo collimated light (substantially collimated lights), for example as a polygon prism 10A7 of FIG. 21, it is understood that the virtual image curve Vr8 of the red light Lr0 and a virtual image curve Vg8 of the green light Lg0 can substantially correspond to each other in position and shape. Therefore, the light path of each of the colors and the shape of the end face of the polygon prism are adjusted in the abovementioned way so that the position shift of each of the color lights during the line-sequential irradiation operation with respect to the liquid crystal display panel 2 is suppressed at maximum.

Next, with reference to FIGS. 1 to 5 and additionally FIGS. 22 to 27, the line-sequential irradiation operation of the backlight system 1 including the light source section 10 will be described in detail in comparison with a comparative example.

Figure 22:
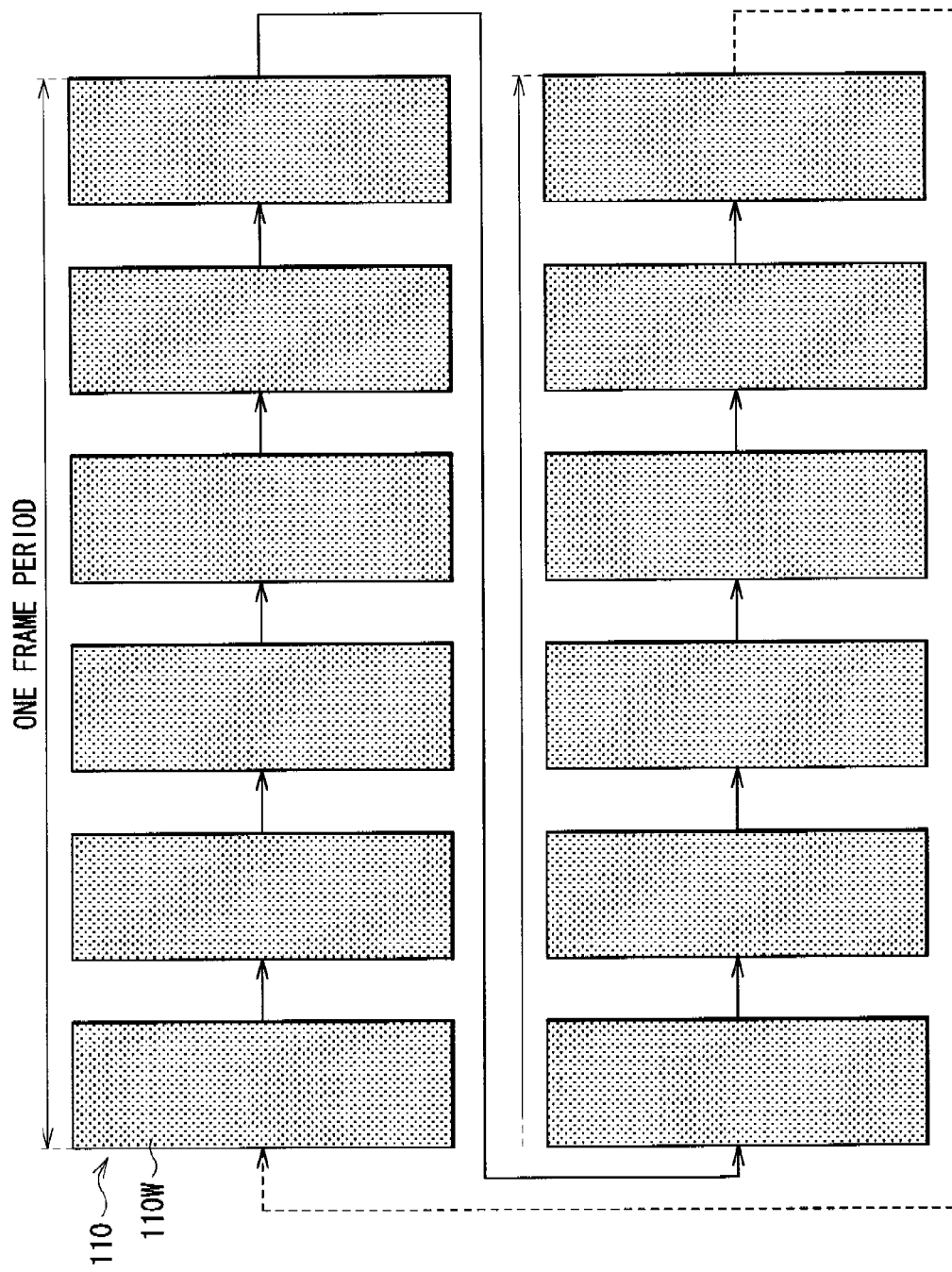
FIG. 22 is a schematic view showing the irradiation condition in one frame period by a light source section according to a comparative example 1.
Figure 23:
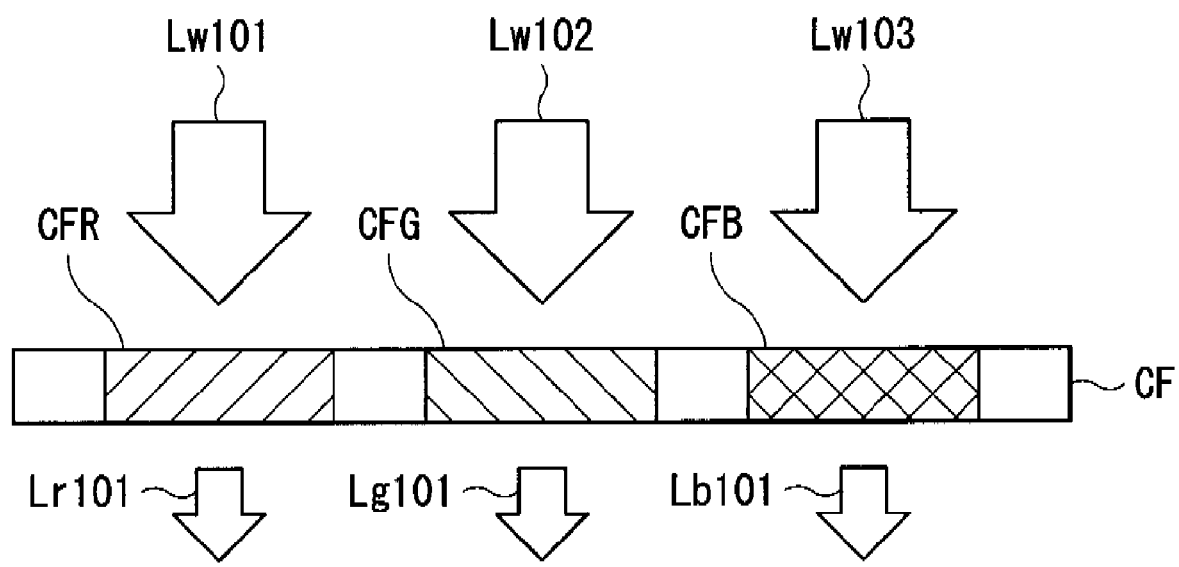
FIG. 23 is a cross-sectional view for explaining use efficiency of the irradiation light according to the comparative example 1.
Figure 24:
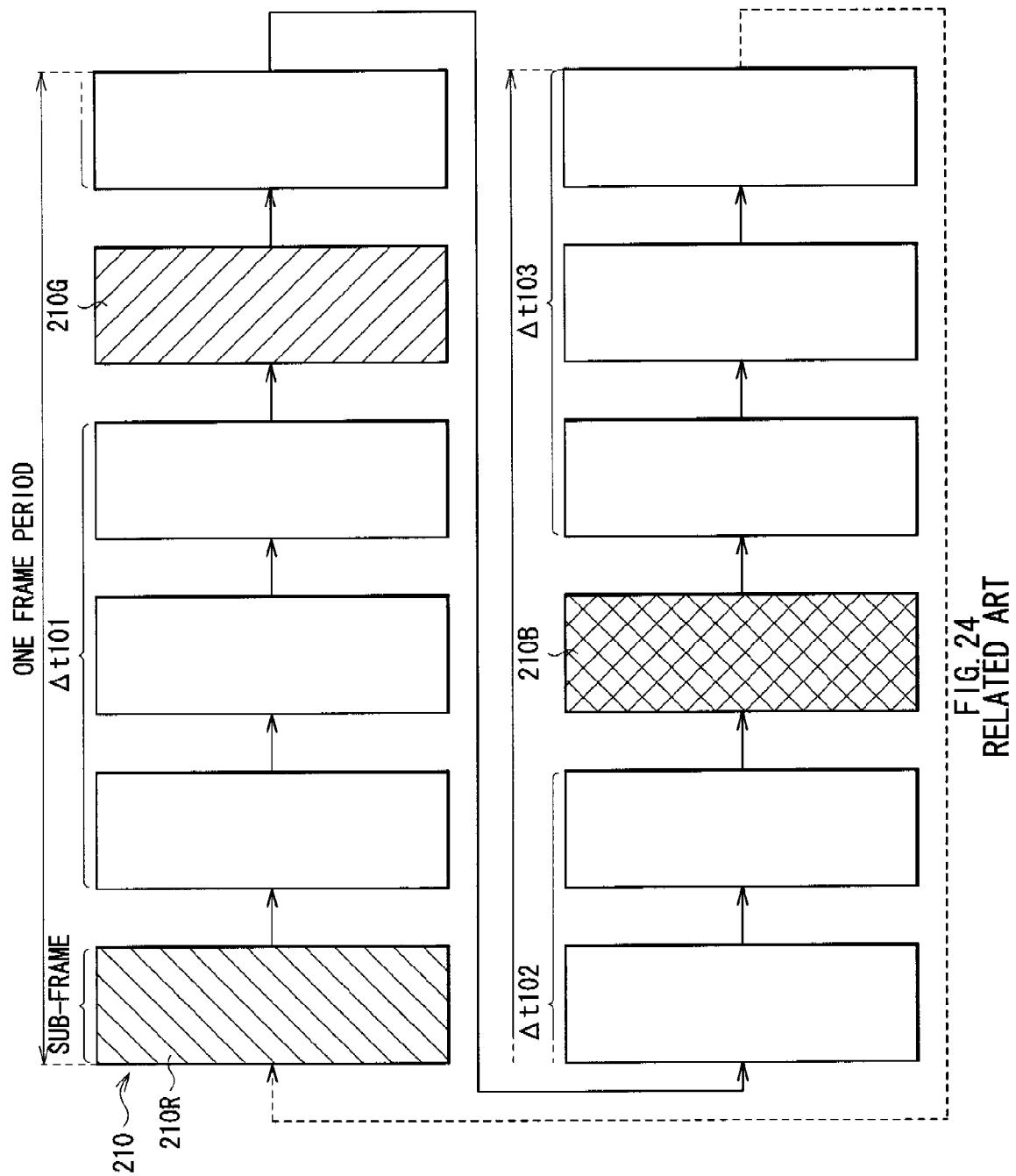
FIG. 24 is a schematic view showing the irradiation condition in one frame period by the light source section according to a comparative example 2.
Figure 25:
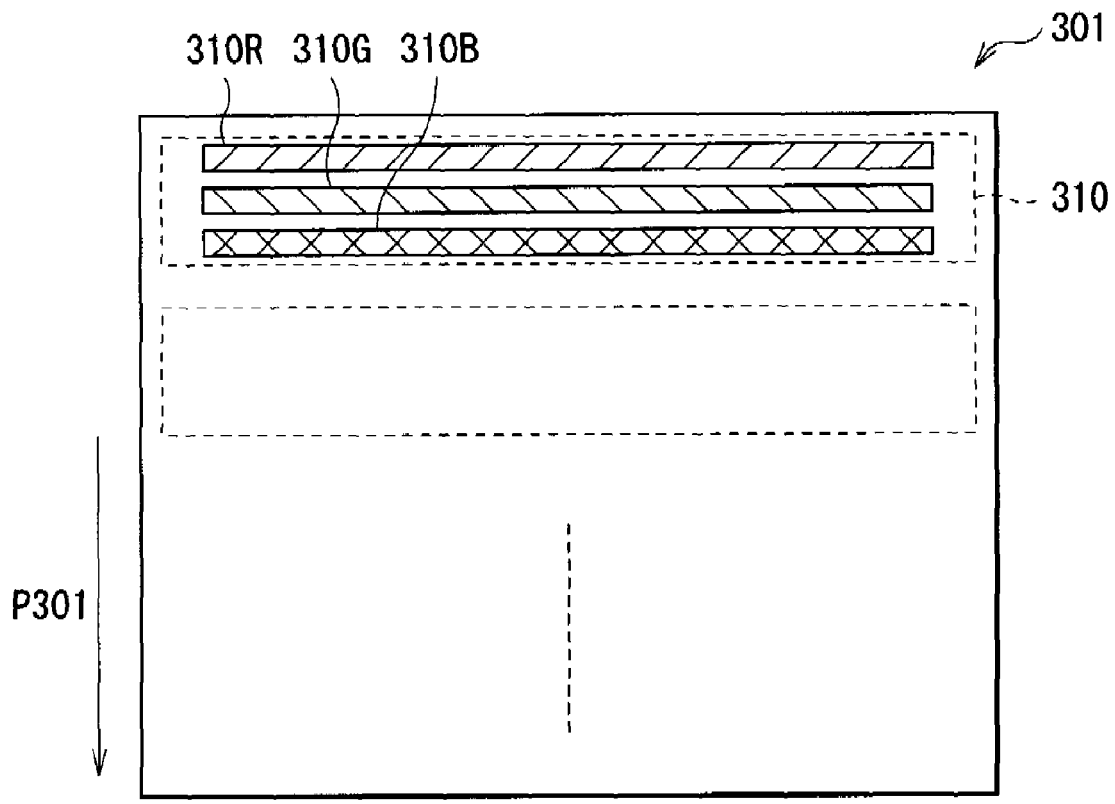
FIG. 25 is a plan view for explaining the configuration and the operation of the light source device according to a comparative example 3.
Figure 26:
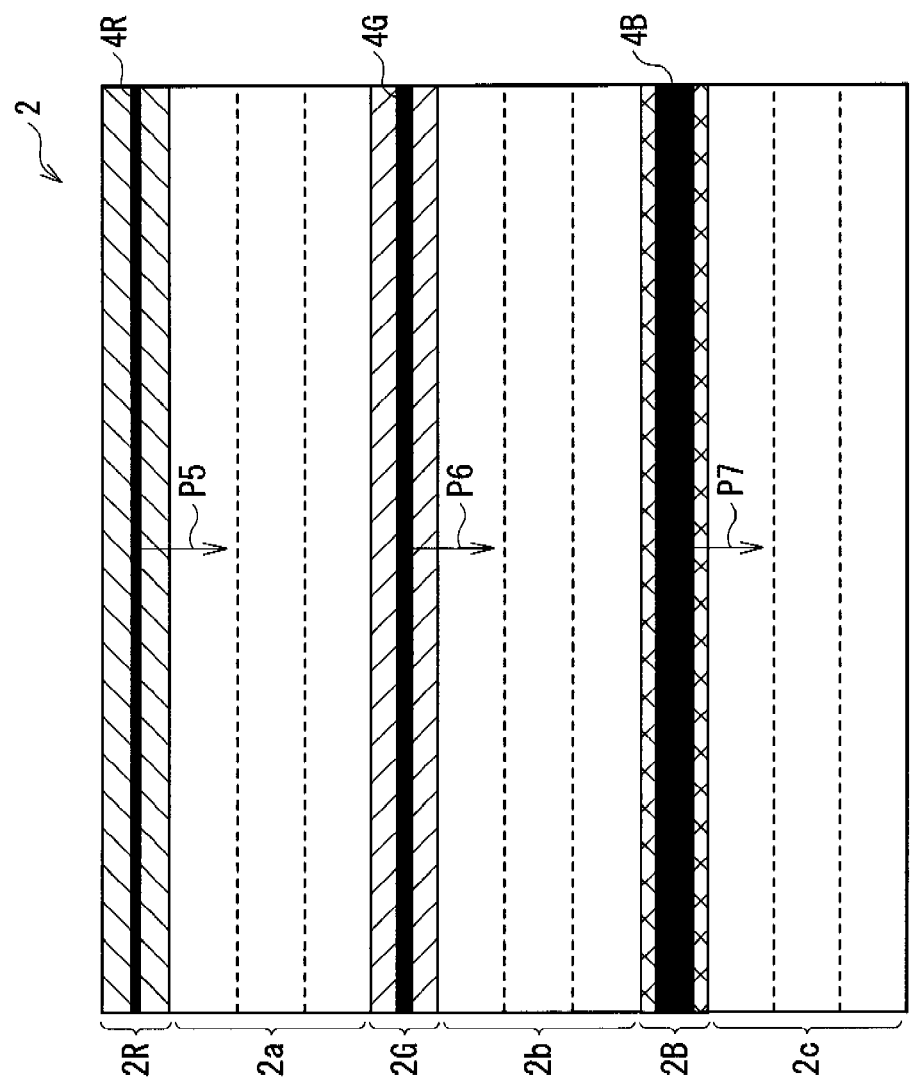
FIG. 26 is a schematic plan view for explaining the relationship between the positions of color lines by the light source device according to an embodiment and the positions of display regions for each of the colors in the liquid crystal display panel.
Figure 27:
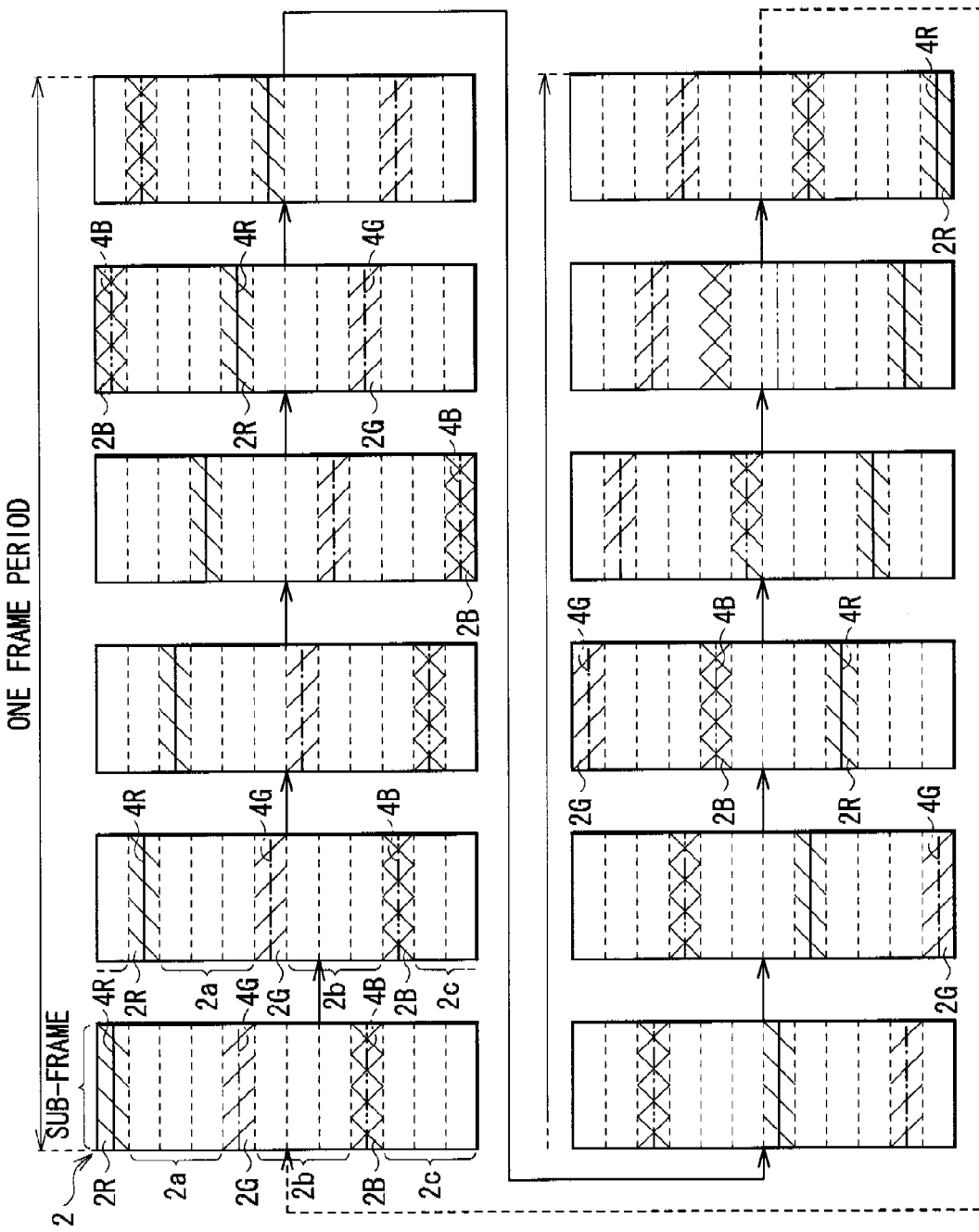
FIG. 27 is a schematic view for explaining displacement aspects of the color lines and display regions for each of the colors according to an embodiment.

Here, FIG. 22 is a plan schematic view showing the operation in one frame period (one vertical operation period) of the backlight system (as illustrated in the cross-sectional view of FIG. 23, the backlight system emitting the white light, and applied to the liquid crystal display panel having color filters CFR for red, CFG for green, and CFB for blue) of the related art according to the comparative example 1. FIG. 24 is a plan schematic view showing the operation in one frame period of the backlight system (the backlight system applied to the liquid crystal display of so-called field sequential method) of the related art according to a comparative example 2. FIG. 25 is a plan schematic view showing the backlight system (the backlight system of the abovementioned Japanese Unexamined Patent Publication Nos. 2002-296588 and 2006-220685) of the related art according to a comparative example 3. FIG. 26 explains the line-sequential irradiation operation of the backlight system 1 according to the embodiment (a plan view of the liquid crystal display panel 2). FIG. 27 is a plan schematic view showing the line-sequential irradiation operation in one frame period. FIGS. 24 and 27 are plan schematic views respectively showing, as state views, the state in one sub-frame period of the plurally divided one frame period.

In the backlight system according to the comparative example 1 illustrated in FIG. 22, white light is uniformly emitted from an entire light source section 110 (the entire light source section 110 is as a white light emission region 10W), and its state is maintained in one frame period so that the emission state is not changed. In color filters CF, for example as illustrated in FIG. 23, white lights Lw101, Lw102, and Lw103 emitted from the light source section 110 are respectively transmitted through the color filter for red CRF, the color filter for green CFG, and the color filter for blue CFB, thereby the red Lr101, the green light Lg101, and the blue light Lb101 can be obtained. Here, because the light loss of the color filter CF is large (although the light-use efficiency of the color filters for each of the colors is different to each other, one color of the three colors is transmitted through each of the colors filter in any ways so that the average theoretical efficiency of the entire color filter CF is approximately ⅓ (approximately 33%). The transmissivity with respect to the transmission light is approximately 80%. In consideration of this, the actual light-use efficiency is calculated as: 33%×80% meaning a further decrease), the light-use efficiency of the light from the light source 110 is largely decreased in the comparative example 1.

In a backlight system according to the comparative example 2 as illustrated in FIG. 24, one frame period is time-divided into a plurality of sub-frame periods (in this case, twelve sub-frame periods), and, in certain sub-frame periods (in this case, four sub-frame periods), different light colors are uniformly and periodically irradiated from the entire light source 210 with respect to the liquid crystal panel (in this case, the sub-frame period with the red light emission region 210R emitting the red light, the sub-frame period with the green light emission region 210G emitting the green light, and the sub-frame period with the blue light emission region 210B emitting the blue light periodically appear). In the periods when these color lights are emitted, image signals corresponding to each of the colors are uniformly supplied to the liquid crystal panel so that the image display for each of the colors is enabled. The sub-frame periods except the sub-frame periods when each of the color lights is emitted are applied to transitional periods (for example, three of the sub-frame periods indicated by a reference numeral Δt101 are transitional periods from the image display state for the red to the image display state for the green, three of the sub-frame periods indicated by a reference numeral Δt102 are the transitional periods from the image display state for the green to the image display state for the blue, and three for the sub-frame periods indicated by a reference numeral Δt103 are the transitional periods from the image display state for the blue to the image display state for the red). In the transitional periods, the light source section 210 is in a light-off state. Thus, in the field sequential method, the lighting period for each of the color lights (the sub-frame period) is one-third of one frame period. Further, the abovementioned transitional periods are necessary so that, although the response time of the liquid crystal is desired to be maintained, a short amount of time of one frame period is applied to the lighting period for each of the color lights (in this case, 1/12 of one frame period (=(⅓)×(¼)). Therefore, when the necessary light amount for one frame period is desired to be maintained, the luminance for each of the colors in the lighting period is necessarily increased twelve times in comparison with the display method using the color filters of the related art. Correspondingly, the cost for the member of the light source section 210 is largely increased.

Further, in the backlight system (the comparative example 3) of the related art illustrated in FIG. 25, a plurality of light sources 310 (a red light source 310R, a green light source 310G, and a blue light source 310B) for each of the colors are used so as to perform the line-sequential lighting for each of the colors as indicated by a reference numeral P301 in FIG. 25. Thus, the always-on lighting for each of the color lights is enabled. However, the period when each one of the light sources is lighted in one frame period is still a short amount of time. Therefore, also in this case, the light emission luminance of each of the light sources 310 in the lighting period is necessarily set high so that the cost for the member of the light source sections 310 is largely increased. Also, in the comparative example 3, a plurality of the light sources 310 for each of the colors are provided so that the cost for the member is also increased from that viewpoint.

On the other hand, in the embodiment, each of the color lights Lr, Lg and Lb is separately emitted from the backlight system 1 having a single light source section 10. For example as illustrated in FIG. 26, lines of each of the color lights (a red light line 4R, a green light line 4G, and a blue light line 4B) are always irradiated to the liquid crystal display panel 2 in positions apart from each other. In the liquid crystal display panel 2, the display regions are divided into a plurality of division regions along the vertical direction, and the image signals for each of the colors corresponding to the display pixels (the pixel electrode 23) of the division regions including the red light line 4R, the green light line 4G and the blue light line 4B so that a display region for red 2R, a display region for green 2G and a display region for blue 2B are respectively formed.

In the liquid crystal display panel 2, a region 2a between the display region for red 2R and the display region for green 2G is applied to the region for the transitional period from the image display state for green to the display state for red, a region 2b between the display region for green 2G and the display region for blue 2B is applied to the region for the transitional period from the image display state for blue to the display state for green, and a region 2c located below the display region for blue 2B is applied to the region for the transitional period from the image display state for red to the display state for blue. Each of the color lights from the backlight system 1 is not irradiated to these regions. Because the red light line 4R, the green light line 4G, and the blue light line 4B, and the display region 2R for red, the display region 2G for green and the display region 2B for blue (and the regions 2a, 2b and 2c) are synchronized to each other, the line-sequential irradiation operation and the line-sequential display operation are periodically performed as respectively shown by reference numerals P5 to P7 in FIG. 26.

Specifically, for example as illustrated in FIG. 27, the red light line 4R, the green light line 4G and the blue light line 4B, and the display region for red 2R, the display region for green 2G and the display region for blue 2B (and the regions 2a, 2b and 2c) are displaced so as to be shifted one by one in the division regions along the vertical direction. When the upper left sub-frame in the figure is set as a base point, for example, during the operation from the fourth sub-frame to the fifth sub-frame, during the operation from the eighth sub-frame to the ninth sub-frame, and during the operation from the twelfth sub-frame to the first sub-frame, the display region for blue 2B and the blue light line 4B located at the bottom of the division regions, the display region for green 2G and the green light line 4G located at the bottom of the division regions, and the display region for red 2R and the red light line 4R located at the bottom of the division regions are respectively located at the top of the division regions in the succeeding sub-frame. Therefore, the periodical operation is performed such that display regions for each of the colors, and each of the color light lines always exist in the division regions, respectively.

In this way, in the embodiment, because the color filters as in the comparative example 1 are unnecessary and each of the color light lines is always irradiated to the liquid crystal display panel 2, the light emission luminance of the light source section is unnecessary to be increased as in the comparative examples 2 and 3. Also, because each of the color lights is emitted from the single light source section 10, a plurality of the light source sections for each of the color lights is unnecessary to be provided as in the comparative example 3. Further, in each of the division regions of the liquid crystal display panel 2, similarly to the comparative example 2, the transitional period from the display region for one color to the display region for another color is provided so that the response period of the liquid crystal can be fully maintained.

Figure 28:
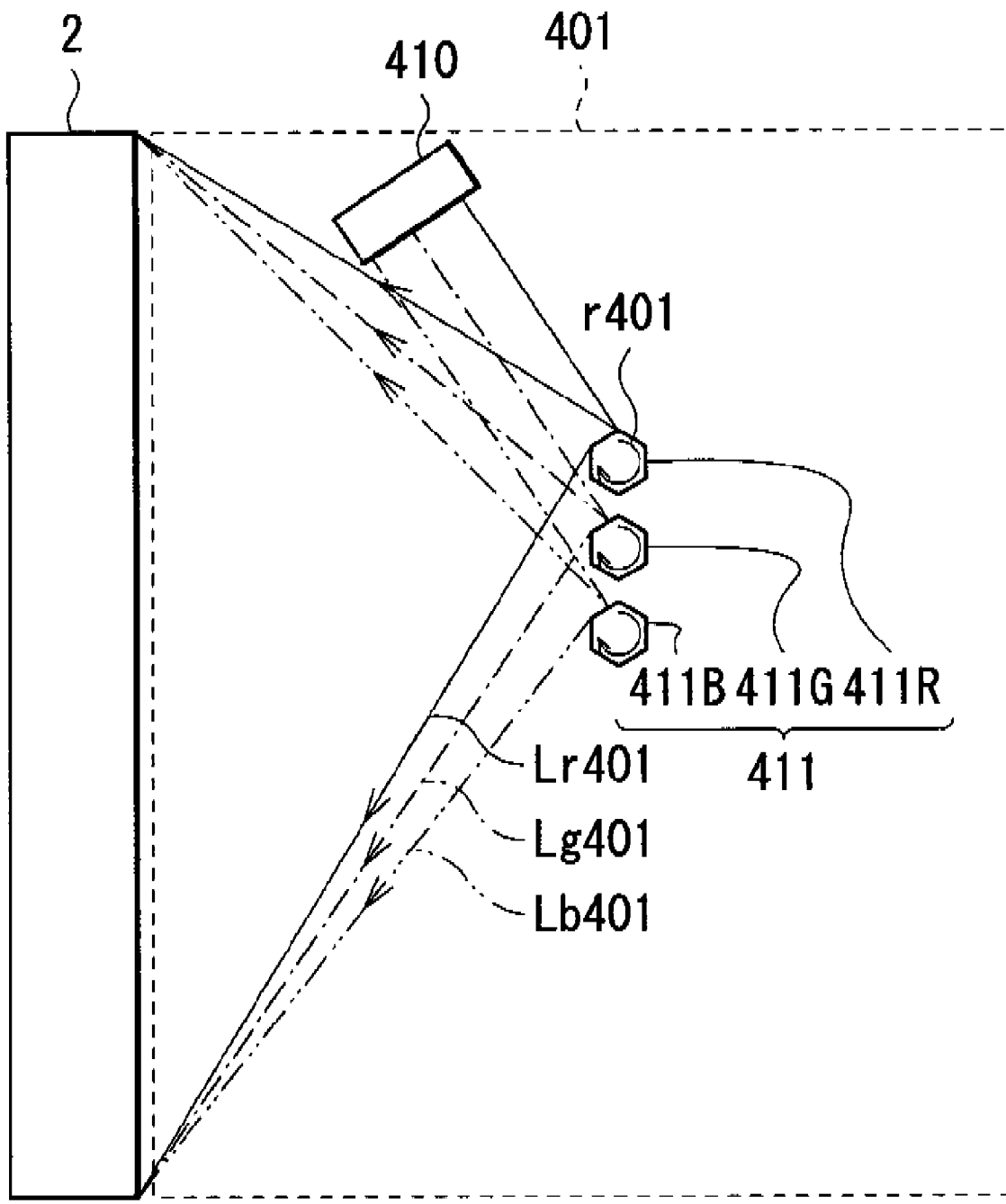
FIG. 28 is a cross-sectional view showing the configuration of the light source device according to a comparative example 4.

In the light source section 10, a plurality of color lights having the wavelength regions different to each other (red light Lr0, green light Lg0, and blue light Lb0) are separately emitted from the red light irradiation section 10r, the green light irradiation section 10g and the blue light irradiation section 10b, and a plurality of these color lights are bended separately with each other by the polygon prism 10A rotating about the central axis. Each of the color lights bended in this way enters into the prism sheet 13 at a small angle, and each of the entered lights is bended at the prism sheet 13 at a substantially orthogonal angle and then irradiated to the above-mentioned liquid crystal display panel 2 as the predetermined irradiation plane. At this time, the rotation operation of the polygon prism 10A is controlled so that each of the color lights emitted from the light source section 10 performs periodically the line-sequential irradiation operation in the liquid crystal display panel 2 in the abovementioned way. Therefore, for example as in FIG. 28, the backlight system is miniaturized (thinned) in comparison with the backlight system 401 (the comparative example 4) composed of the light source section 410 emitting the red light Lr401, the green light Lg401, and the blue light Lb401, and the polygon mirror 411 (411R, 411G and 411B) reflecting each of the color lights by the rotation in the way of a reference numeral r401.

In the embodiment, provided are the prism sheet 13 which can bend the incident light at a substantially orthogonal angle, and the light source section 10 which can separately emit, to the prism sheet 13 at a small angle, a plurality of color lights (the red light Lr0, the green light Lg0 and the blue light Lb0) having the wavelengths different with each other, and also each of the color lights periodically performs the line-sequential irradiation operation in the liquid crystal display panel 2 so that the color display can be realized without providing a plurality of light sources and a plurality of color filters for each of the colors. This leads to the cost reduction for the member. Also, the miniaturization (thinning) can be achieved in comparison with the case where the polygon mirrors for each of the colors are provided (comparative example 4). Therefore, the color display having the high light-use efficiency with the simple configuration can be realized.

The light source section 10 includes the light source which can separately emit each of the color lights (the red light Lr0, the green light Lg0, and the blue light Lb0), and the polygon prism 10A rotating about the central axis and can bend, independently to each other, a plurality of color lights emitted from the light source. Also, in the liquid crystal display panel 2, the rotation operation of the polygon prism 10A is controlled so that each of the color lights periodically performs the line-sequential irradiation operation in the liquid crystal display 2. Thus, miniaturization (thinning) of the backlight system can be achieved, and therefore the color display having the high light-use efficiency with the simple configuration can be realized.

A plurality of color lights Lr, Lg and Lb having wavelength regions different from each other are separately emitted from the light source section 10, and each of the color lights is always emitted in positions apart from each other, and periodically performs the line-sequential irradiation operation in the liquid crystal display panel 2 (the color lines 4R, 4G, and 4B are always located in positions apart from each other, and periodically perform the line sequential operation). Thus, the light emission luminance of the light source 10 in the irradiation time is unnecessary to be increased, and each of the color lights can be always emitted. Therefore, the color display having the high light-use efficiency with the simple configuration can be realized.

The color filters as in the comparative example 1 are unnecessary, and this leads to the cost reduction for the member and the cost reduction for the power consumption in the liquid crystal display 3.

Because the display pixels (sub-pixels) for each of red, green and blue is unnecessary to be provided, in the case of having the same pixel pitch, the definition of the display pixels can be increased three times. Also, the definition of the same display pixel can be realized with the display pixel with tripled dimension.

Figure 29:
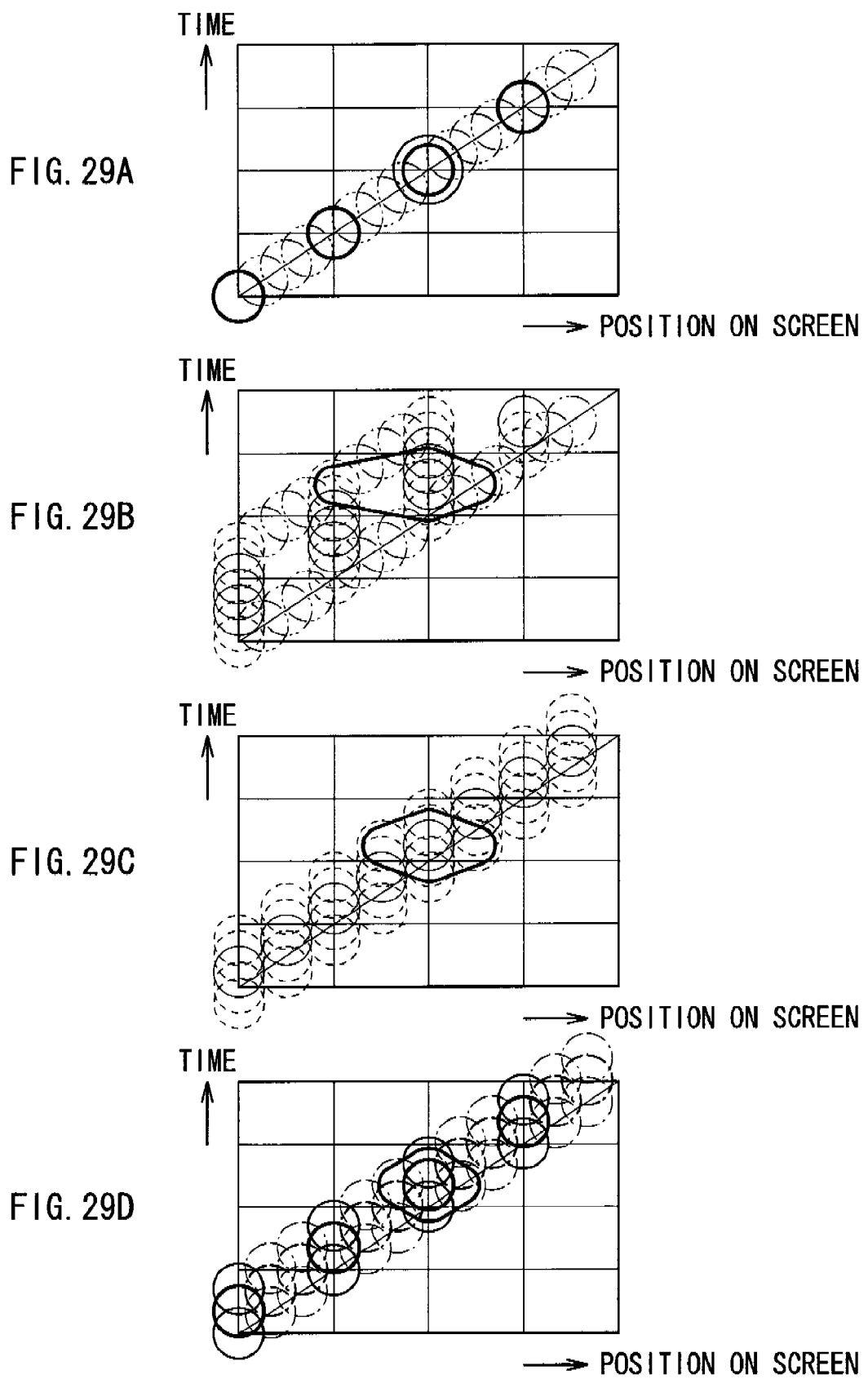
FIGS. 29A to 29D are characteristic views for explaining response of motion pictures in the liquid crystal display according to an embodiment in comparison with the comparative example.

Further, when seeing each of the division regions of the liquid crystal display panel 2, the transitional periods respectively exist in which the irradiation lights Lout are not emitted from the backlight system 1. Accordingly, this display method is applied to the impulse type display method such as cathode ray tube (CRT). Thus, the response of motion picture in the liquid crystal display 3 can be improved. Specifically, for example as respectively shown in FIGS. 29A to 29D where the response of motion picture of when an object is transformed on the display screen is indicated, the response of the motion picture according to the embodiment of the liquid crystal display 3 as in FIG. 29D is improved in comparison with the case of FIG. 29B (in the case of the general liquid crystal displays of the related art; the motion picture response time (MPRT) is approximately 12 ms), and thus the similar characteristics as in FIG. 29A (in the case that the display device is CRT; MPRT is approximately 4 ms) and FIG. 29C (in the case of the liquid crystal display of the related art where the frame rate is approximately 120 Hz; MPRT is approximately 6 ms) can be obtained.

Hereinbefore the present invention is described with the embodiment. However, the present invention is not limited to the embodiment as various modifications are available.

Figure 30:
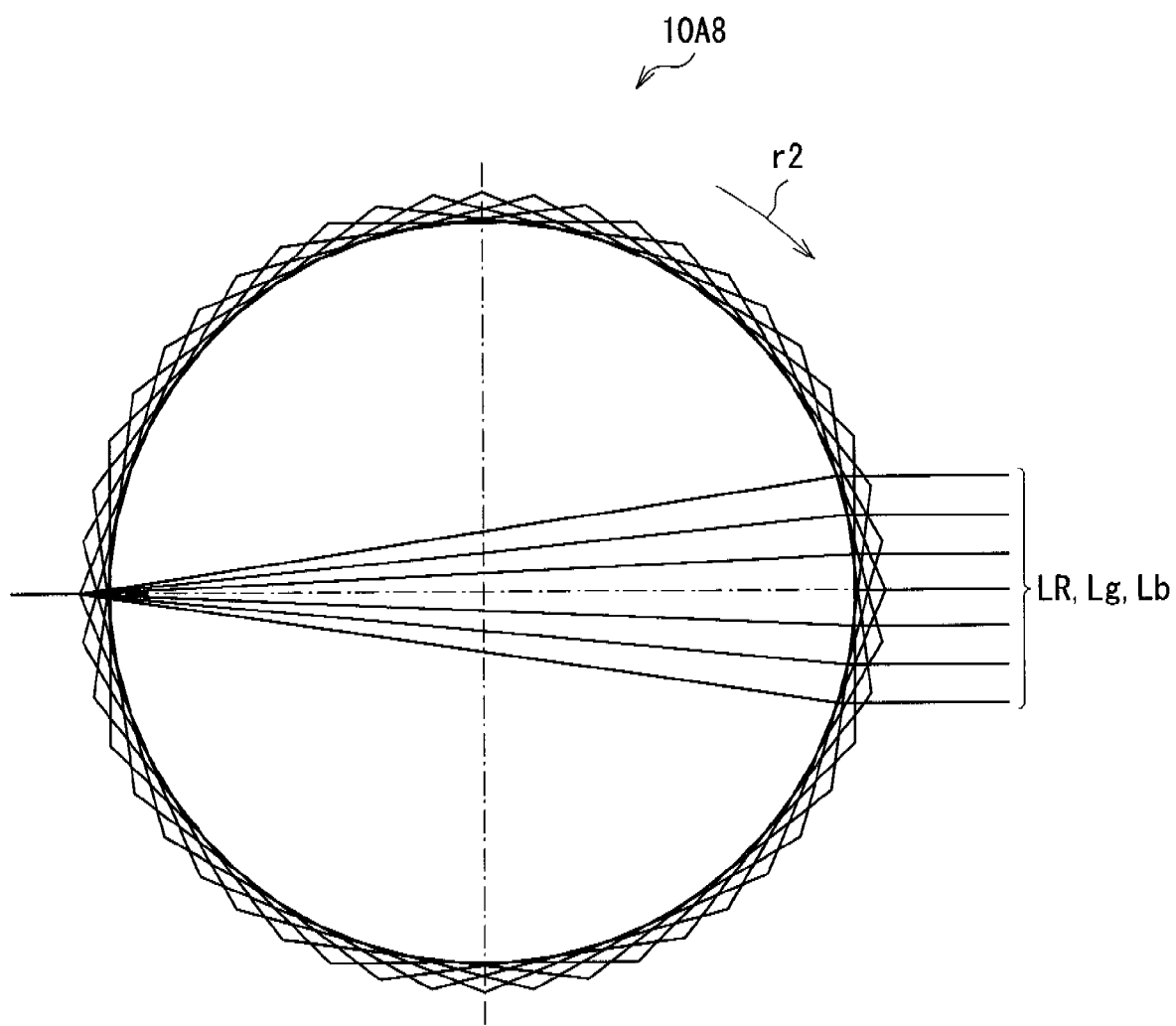
FIG. 30 is a cross-sectional view showing the configuration of polygon prism according to a modification of an embodiment.
Figure 31:
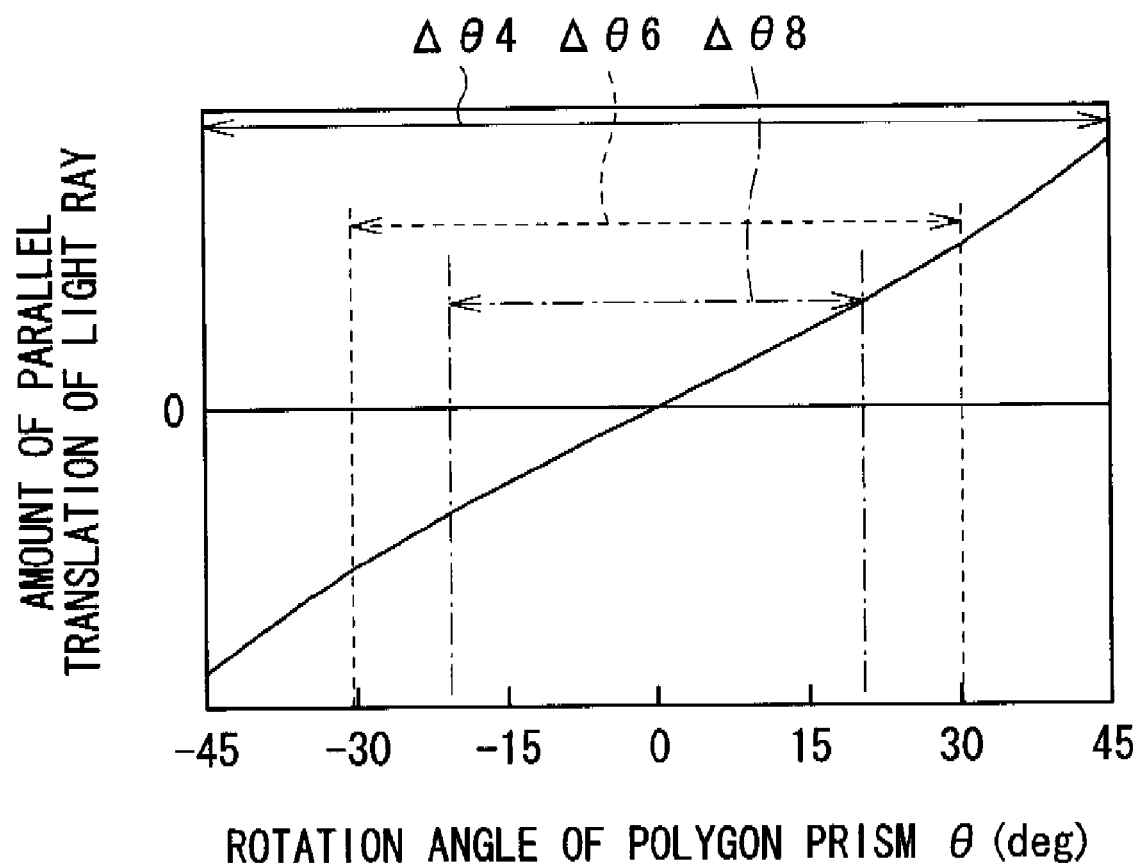
FIG. 31 is a characteristic diagram showing the relationship between a shape of the polygon prism and linearity of amount of collimated translation of an incident light ray.

For example, in the embodiment, the case is explained where the polygon prism is configured by a tetrahedron. However, for example similarly to the polygon prism in FIG. 30, the polygon prism may be configured by a hexahedron, an octahedron or other polyhedrons (shown in FIG. 30 is a polygon prism 10A8 of the octahedron rotating about the central axis in the way of the reference numeral r2). In the case that the rotation angle of the polygon prism is θ (degree), for the amount of collimated translation of the incident light ray to the polygon prism, as illustrated in FIG. 31, as the number of planes of the polygon prism is increased, the number of rotation is decreased so that the linearity is increased. This linearity is preferable. However, in this case, the amount of collimated translation of the light ray obtained from the polygon prism is decreased. That is, when comparing the polygon prisms having the same out side diameter of the circumscribed circle, the amount of the collimated translation (Δθ6) of the light ray of the hexahedron polygon prism is larger than the amount of the collimated translation (Δθ8) of the light ray of the octahedron polygon prism, and further, the amount of the collimated translation (Δθ4) of the light ray of the tetrahedron polygon prism is larger than the amount of the collimated translation (Δθ6) of the light ray of the hexahedron polygon prism. Therefore, as the number of planes of the polygon prism is decreased, the range for the amount of collimated translation of the light ray can be increased.

Figure 32:
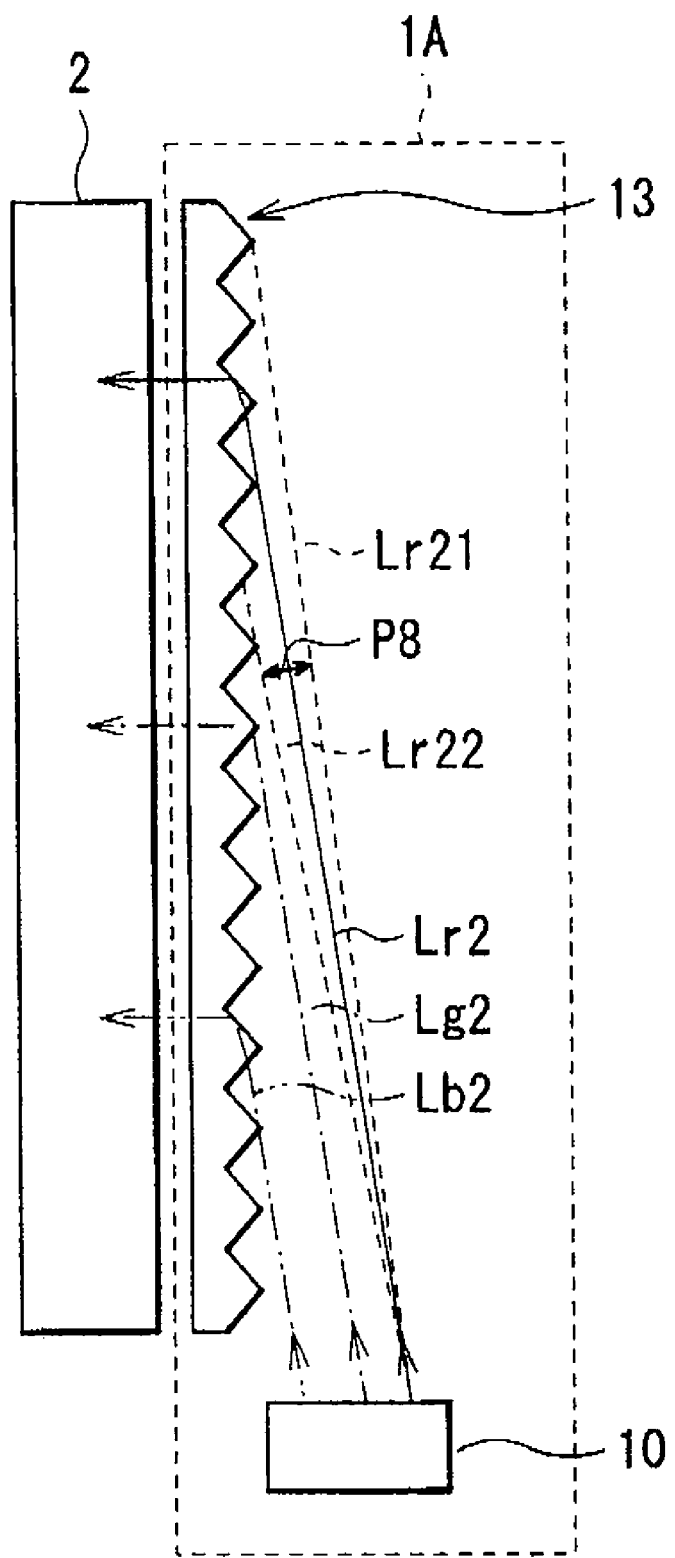
FIG. 32 is a cross-sectional view showing the configuration of the light source device according to a modification of an embodiment.

In the embodiment, as illustrated in FIG. 2, the case is explained where the stacked light guide plate 14 is provided between the light source section 10 and prism sheet 13 (the backlight system 1). However, as the backlight system 1A illustrated in the cross-sectional view of FIG. 32, for example, each of the color lights Lr2, Lg2, and Lb2 as the ideal collimated lights can be emitted from the light source 10. If the displacement of the exit angle of each of the color lights is made so small that it can be omitted, the stacked light guide plate 14 may not be provided in the backlight system. In such a configuration, the configuration of the backlight system can be further simplified and the const reduction for the member can be achieved.

Figure 33A:
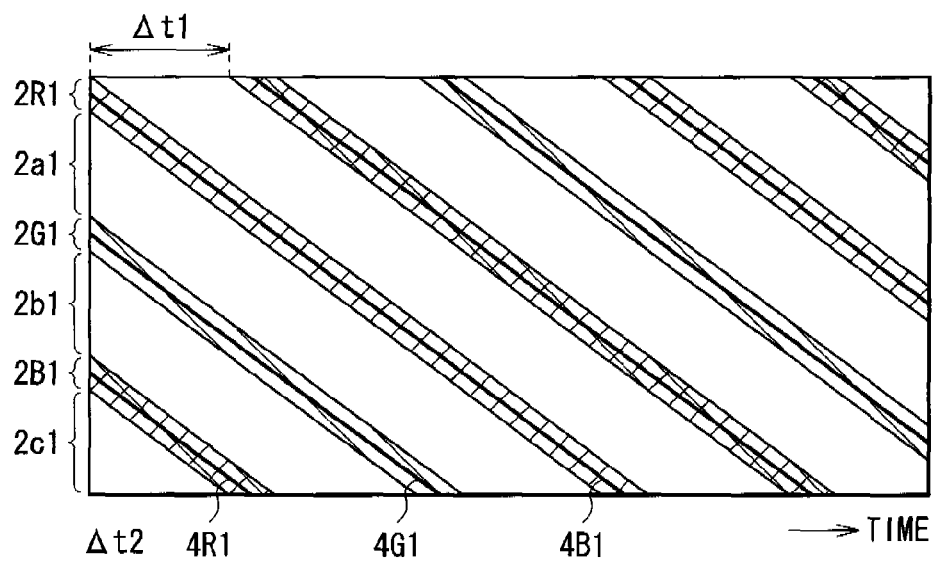
FIGS. 33A to 33C are schematic views for explaining the relationship between the linearity with respect to the time change of color line positions and the aspects with respect to the time change of each of the colors display regions.
Figure 33B:
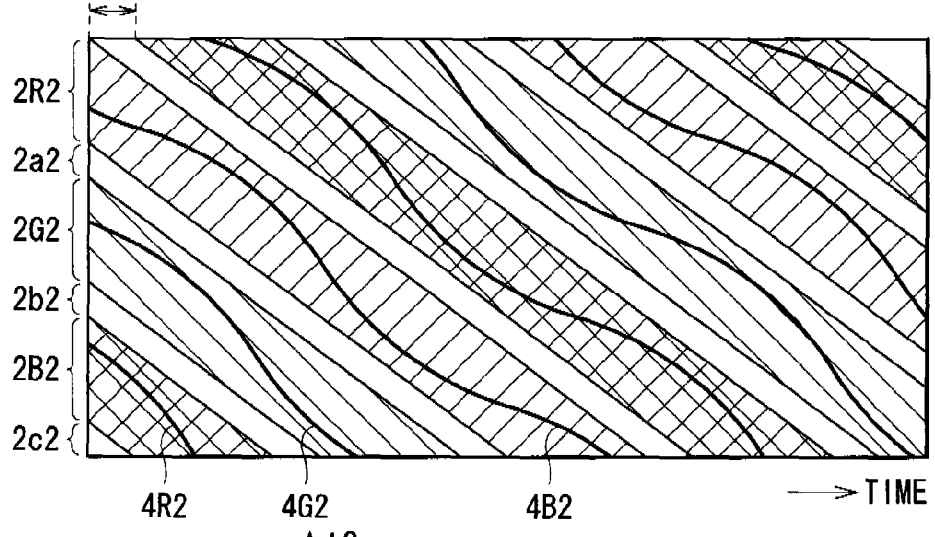
Figure 33C:
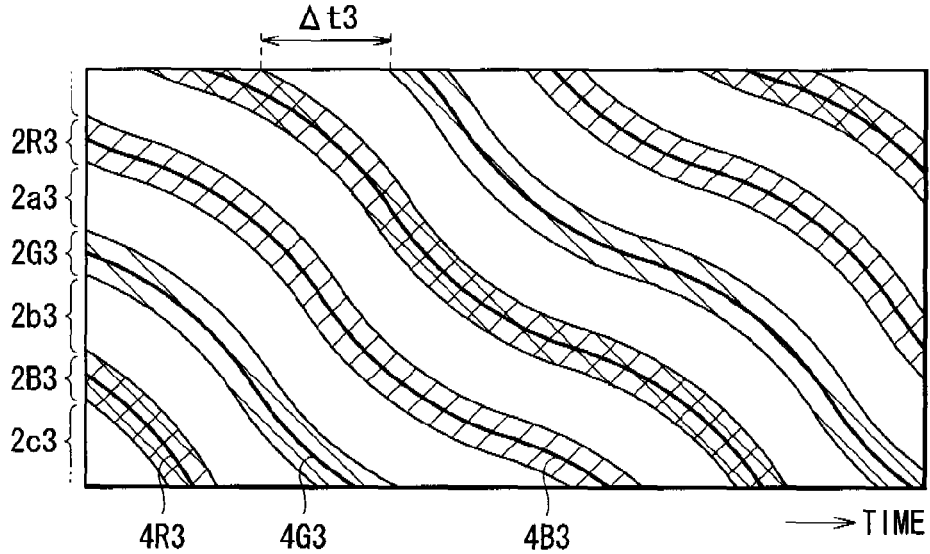

In the liquid crystal display of the present invention, for example as illustrated in FIG. 33A, it is ideal that the line-sequential irradiation operation to the red light line 4R1, the green light line 4G1 and the blue light line 4B1 is applied to the linear operation with respect to the time change. However, as illustrated in FIGS. 33B and 33C, for example, there may be a case where the line-sequential irradiation operation by the red light line 4R1, the green light line 4G1 and the blue light line 4B1 is applied to the non-linear operation with respect to the time change. In this way, in the case that the line-sequential irradiation operation is applied to the non-linear operation with respect to the time change, as the display region for red 2R3, the display region for green 2G2 and the display region for blue 2B2 illustrated in FIG. 33C, the non-linear operation of the line-sequential irradiation operation is corresponding to the non-linear operation by the red light line 4R1, the green light line 4G1 and the blue light line 4B1 so that each of the color light lines is preferably included, rather than, as the display region for red 4R2, the display region for green 4G2 and the display region for blue 4B2 illustrated in FIG. 33B, the width of the display region for each of the colors (the width of the supply region of the image signal for each of the colors) is increased (widened) by the control of the display timing by a timing control section 61 so that each of the color light lines is included. This is because, in the case of the configuration such as FIG. 33B, the transitional period Δt1 for transition from the image for one color to the image for another color is shortened as the transitional period Δt2 of FIG. 33B so that the time allocated for the response time of the liquid crystal is also shortened. In other words, in the case of the configuration such as FIG. 33C, in each of the display lines, after the line-sequential irradiation of one color light passes, the display changeover can be immediately performed from the image of that color light to the image of another color light. Thus, the width of the display regions for each of the colors (the width of the supply region of the image signal for each of the colors) is unnecessary to be increased (widened), thereby the transitional period Δt3 for the transition from the image for one color light to the image for another color light can be set as the same level as the transitional period Δt1 of FIG. 33A (at least optimal with respect to the non-linearity). Therefore, with such a configuration, the response time of the liquid crystal can be maximally maintained, although the line-sequential irradiation operation is applied to the non-linear operation with respect to the time change.

Figure 34A:
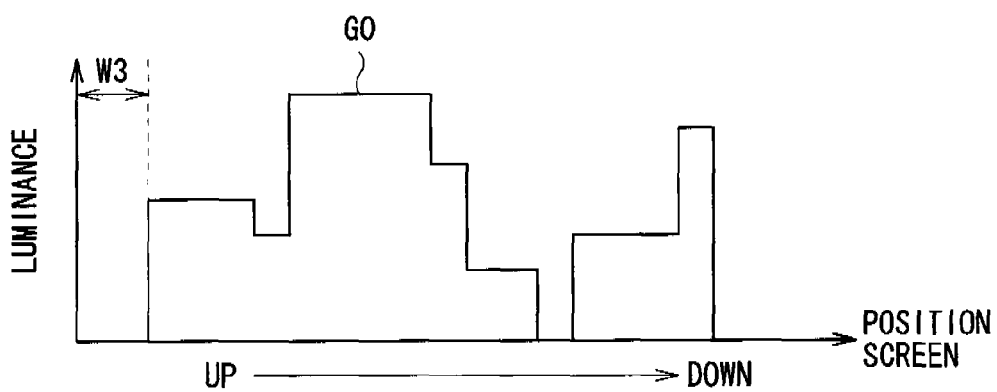
FIGS. 34A to 34C are the characteristic diagrams for explaining the relationship between the necessary luminance desired by the light source device and irradiation luminance at a time of displacement of the color lines according to a modification of an embodiment.
Figure 34B:
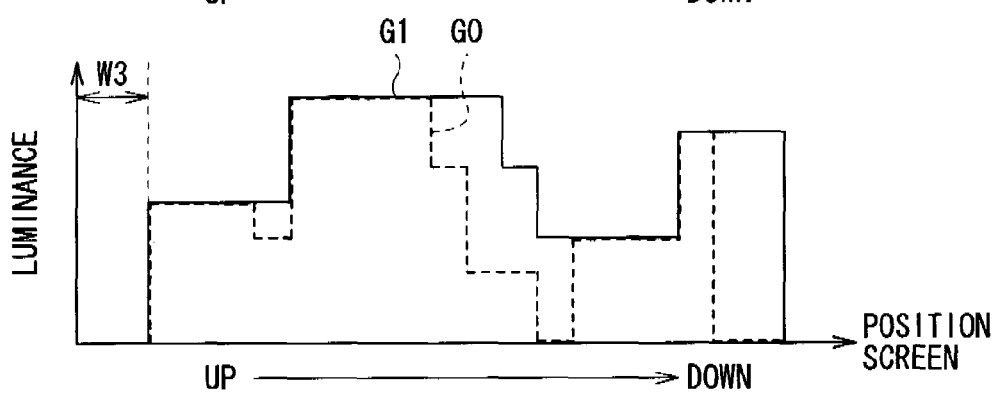
Figure 34C:
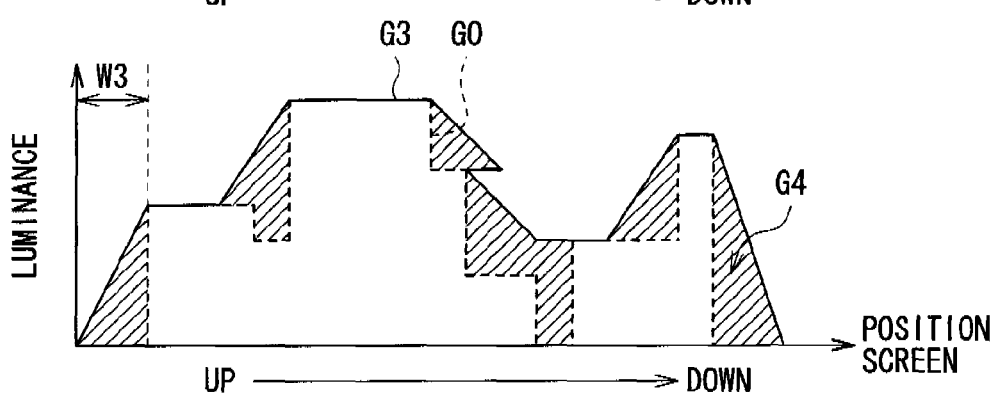

In the case that the light source device of the present invention is applied to the liquid crystal display of a so-called part drive system, when the irradiation luminance distribution of the irradiation to each of the positions in the liquid crystal display panel 2 is set, for example, as illustrated in FIG. 34A (a luminance distribution G0), the irradiation luminance of each of the color light lines (the line-sequential irradiation operation for each of the color lights) is necessarily set in consideration of a width W3 of each of the color light lines. In that case, an example of setting method of the irradiation luminance will be described in the following. When the front end position of each of the color light lines reaches the set luminance line G0 in FIG. 34A, in the case that the set luminance is higher than the previous irradiation luminance, the irradiation luminance is made to be increased to the level of the set luminance, and on the other hand, in the case that the previous irradiation luminance is higher than the set luminance, the irradiation luminance is made to be unchanged. Also, the irradiation luminance is decreased when the rear end position of each of the color light lines reaches the position where the set luminance is decreased. Although the value to be decreased is naturally the value of the set luminance decreased at that point, the condition is established such that the value to be decreased is not less than the set luminance in the front end position of each of the color light lines. That is, the irradiation luminance in the front end position of each of the color light lines is made to exceed the specified luminance in the luminance distribution in this front end position. In this way, for example as illustrated in FIG. 34B, the irradiation luminance setting line is determined with respect to the front end position of each of the color light lines as the base line. In the case that the irradiation setting line is determined with respect to the rear end position of each of the color light lines as the baseline, the setting line is upwardly shifted on the screen by the width of each of the color light lines. In such a configuration, the irradiation luminance of each of the color light lines is as illustrated in an irradiation luminance G3 of FIG. 34C. An integration value G4 as the difference between the irradiation luminance G3 and the irradiation luminance on the luminance distribution G0 is a redundant luminance. However, this redundancy is inevitable as long as each of the color light lines has the width W1.

In the embodiment, the case is explained where the light source section 10 separately emits the red light Lr, the green light Lg and the blue light Lb (in the case that the light source section 10 includes a red LED 10r0, a green LED 10g0 and a blue LED 10b). In addition to this (or in substation of this), the light source section 10 may include the LED emitting another color light. For example, in the case that the light source section 10 separately emits the color lights of four colors or more, and the image signal corresponding to each of the colors is supplied to the liquid crystal display panel 2 using the line-sequential operation as same as in the embodiment, the color reproduction range is increased in comparison with the embodiment so that more multicoloreds can be expressed.

In the embodiment, the case is explained where the liquid crystal display 3 is a transmission-type liquid crystal display including the backlight system 1. However, a front light device may be configured by the light source device of the present invention as a reflective type liquid crystal display.

Further, by providing a projection means for projecting the light modulated by the liquid crystal panel 2 (the display light Dout) to the screen, the liquid crystal display of the present invention can be configured as a liquid crystal projector. In the case of the configuration of such a liquid crystal projector, as opposed to the related art where the liquid crystal projector of a so-called three-planes method configured by the light source emitting the white light, a separation means separating this white light into the red light, the green light and the blue light, three light valves corresponding to each of the color lights, and an emission means synthesizing each of the color lights again, the liquid crystal projector can be configured by the light source device including the light source (the light source 10) respectively and separately emitting the red light, the green light and the blue light, one light valve (the liquid crystal display panel 2) and the projection means projecting the display light Dout. Therefore, the device configuration is simplified and the cost reduction for the member can be achieved, and the response of the motion picture can be improved by the abovementioned impulse-type display method.

It should be understood by those skilled in the art that various modifications, combinations, sub-combinations and alterations may occur depending on design requirements and other factors insofar as they are within the scope of the appended claims or equivalents thereof.

What is claimed is:

1. A light source device comprising:
   a prism sheet disposed to face a plane to be irradiated, and to bend an incident light to a direction substantially orthogonal to an incident direction;
   a light source section separately emitting a plurality of color lights having wavelength regions different from each other so that each of the color lights enters into the prism sheet at a small angle with respect to an extending direction of the prism sheet;
   a light source drive means for driving the light source section so that each of the color lights periodically scans the plane to be irradiated so as to perform a line-sequential irradiation operation; and
   a light guide section (i) disposed between the light source section and the prism sheet, (ii) configured to separately guide each of the color lights to the prism sheet and (iii) haying an inclination with respect to the prism sheet so that each of the color lights separately enters the prism sheet at the small angle.

2. The light source device according to claim 1, wherein the light guide section is configured by stacking a plurality of light guide plates, each of the light guide plates being configured to guide each of the color lights to the prism sheet.

3. The light source device according to claim 1, wherein a thickness of each of a plurality layered light guide plates is made smaller than an irradiation line width of each of the color lights irradiated from the light source section to the light guide section during the line-sequential irradiation operation.

4. The light source device according to claim 1 applied to a liquid crystal panel modulating the incident light on the basis of a(n) image signal, wherein the light source device is configured as a backlight system which emits each of the color lights as the incident light from the light source section toward the liquid crystal panel as the plane to be irradiated, the light source section being line-sequentially controlled by the light source drive means.

5. The light source device according to claim 1, wherein the small angle is about 3 degrees.

6. The light source device according to claim 1, wherein the prism sheet has a flat surface on a plane side and a prism in triangle shape surface on a light guide section side.

7. A liquid crystal display comprising:
   an irradiation means for emitting a light, the irradiation means having a prism sheet and a light source section disposed between the irradiation section and the prism sheet;
   a liquid crystal panel modulating the light emitted from the irradiation means on the basis of an image signal and disposed to face the prism sheet; and
   a light source drive means for driving the light source section so that each of the color lights periodically scans the liquid crystal panel so as to perform a line-sequential irradiation operation,
   wherein,
   the prism sheet bends an incident light to a direction substantially orthogonal to an incident direction, and
   the light source section is configured to separately emit a plurality of color lights having wavelength regions different from each other at a small angle with respect to an extending direction of the prism sheet so that each of the color lights separately enters into the prism sheet at the small angle.

8. The liquid crystal display according to claim 7 configured as a liquid crystal projector comprising:
   a projection means to project the light emitted from the light source section and modulated by the light crystal panel to a screen.

9. The liquid crystal display according to claim 7, wherein the small angle is about 3 degrees.

10. The liquid crystal display according to claim 7, wherein the light source section includes a light guide configured to separately guide each of the color lights to the prism sheet and having an inclination with respect to the prism sheet so that each of the color lights separately enters the prism sheet at the small angle.

11. The liquid crystal display according to claim 10, wherein the prism sheet has a flat surface on a liquid crystal panel side and a prism in triangle shape surface on a light guide side.

12. A method of realizing a color display with a light source device, the method comprising:
- facing a prism sheet toward a plane to be irradiated:
- bending an incident light to a direction substantially orthogonal to an incident direction using the prism sheet:
- emitting a plurality of color lights having wavelength regions different from each other using a light source section so that each of the color lights enters into the prism sheet at a small angle with respect to an extending direction of the prism sheet;
- driving the light source section with a light source drive section so that each of the color lights periodically scans the plane to be irradiated so as to perform a line-sequential irradiation operation; and
- separately guiding each of the color lights to the prism sheet with a light guide section (i) disposed between the light source section and the prism sheet, and (ii) having an inclination with respect to the prism sheet so that each of the color lights separately enters the prism sheet at the small angle.

13. The method according to claim 12, wherein the small angle is about 3 degrees.

14. The method according to claim 12, wherein the prism sheet has a flat surface on a plane side and a prism in triangle shape surface on a light guide section side.

15. A method of realizing a color display with a liquid crystal display, the method comprising:
- emitting light using an irradiation section having a prism sheet and a light source section disposed between the irradiation section and the prism sheet;
- modulating the light emitted from the irradiation section on the basis of an image signal using a liquid crystal panel disposed to face the prism sheet:
- bending an incident light to a direction substantially orthogonal to an incident direction using the prism sheet;
- separately emitting a plurality of color lights having wavelength regions different from each other at a small angle with respect to an extending direction of the prism sheet using the light source section so that each of the color lights separately enters into the prism sheet at the small angle: and
- driving the light source section using a light source drive section so that each of the color lights periodically scans the liquid crystal panel so as to perform a line-sequential irradiation operation.

16. The method according to claim 15, wherein the small angle is about 3 degrees.

17. The method according to claim 15, wherein the light source section includes a light guide configured to separately guide each of the color lights to the prism sheet and having an inclination with respect to the prism sheet so that each of the color lights separately enters the prism sheet at the small angle.

18. The method according to claim 17, wherein the prism sheet has a flat surface on a liquid crystal panel side and a prism in triangle shape surface on a light guide side.

* * * * *